United States Patent [19]

Nuttall et al.

[11] Patent Number: 5,604,892
[45] Date of Patent: Feb. 18, 1997

[54] METHOD FOR MODELING A PHYSICAL SYSTEM OF ELEMENTS USING A RELATIONAL DATABASE

[76] Inventors: David J. H. Nuttall, 20634 NE. 181 Pl., Woodinville, Wash. 98072; Bertram G. Brehm, 25119 NE. 18 St., Redmond, Wash. 98053

[21] Appl. No.: 359,335

[22] Filed: Dec. 19, 1994

Related U.S. Application Data

[63] Continuation of Ser. No. 941,366, Sep. 1, 1992, abandoned.
[51] Int. Cl.⁶ ...................................................... G06F 17/30
[52] U.S. Cl. ........................... 395/500; 395/615; 395/614; 364/578
[58] Field of Search ................................... 395/500, 600; 364/578

[56] References Cited

U.S. PATENT DOCUMENTS

| | | | |
|---|---|---|---|
| 4,479,196 | 10/1984 | Ferrer et al. | 395/600 |
| 5,019,961 | 5/1991 | Addesso et al. | 364/578 |
| 5,268,837 | 12/1993 | Saylor | 364/167.01 |

OTHER PUBLICATIONS

"Entwicklung von Expertensystemen," Kiezulas and Klar, Elektronik, vol. 40, No. 22, Oct. 29, 1991, pp. 122–134. (German to English translation of pp. 129–131 attached).
"G2: A Software Platform for Intelligent Process Control," R. L. Moore, Proceedings of the 1991 IEEE Intl. Symposium on Intelligent Control, Arlington, VA, Aug. 13–15, 1991, (Reprint), pp. 1–5.
Robert Moore et al., *Object Oriented Rapid Prototyping with G2*, Proc. 2nd Int. Conf. on Industrial and Engineering Applications of Artificial Intelligence and Expert Systems, (IEA/AIE), 1989, Tullahoma (TN), 6–9 Jun., (ACM, NY) vol. 2 620–630.

Chen, Peter Pin-Shan, "The Entity–Relationship Model—Toward a Unified View of Data," vol. 1, No. 1, pp. 9–36 (Mar. 1976), ACM Transactions on Database Systems.

Grant, John, *Logial Introduction to Databases*, Hartcourt Brace Jovanovich, Publishers, pp. 14–18 (1987).

Cattell, R. G. G., *Object Data Management*, Addison–Wesley Publishing Company, pp. 52–57 (1994).

"Object Oriented Models and their Application in real-time Expert Systems," A. G. Hofmann et al., Proceedings of the SCS Western Multiconference, 1989, San Diego, CA, Jan. 4–6, 1989, vol. 20, No. 3, pp. 27–32.

*Primary Examiner*—Vincent N. Trans
*Attorney, Agent, or Firm*—Stoel Rives LLP

[57] ABSTRACT

An information model based on a physical system, such as the physical equipment in a power system. An object-oriented information model provides a generic power system model that may be applied to any of several specific applications. In the invention, physical pieces of equipment are represented as objects with attributes that can be verified (primary data) and relations including connectivity, grouping, and location. The model handles all known configurations of power systems and is extensible to new configurations. Attribute input is supported from primary sources and is used to calculate data required by applications programs. A window-based graphical user interface uniquely simplifies operation of the database. Thus, the present invention provides a single, easy to use, source for all proprietary application databases at a utility.

27 Claims, 35 Drawing Sheets

Microfiche Appendix Included
(3 Microfiche, 209 Pages)

FIG. 7

AE Substation MCTN_AE

File  Edit

| Primary group: | AE | Type: | Substation | Name: | MCTN_AE |
| In service: | 09-Sep-1978 00:00 | Out of service: | | Last edit: | |
| Position X: | 206340.00 | Position Y: | 135135.00 | | |
| Owner #: | MC206135TN | Spec #: | 78-135246 | Serial #: | |
| Description: | 115kV switchyard | | | | |
| Comment: | | | | | |

[ Add ]  [ Replace ]  [ Network ]  [ Measurements ]

FIG. 8

| | | | |
|---|---|---|---|
| BUXM Capacitor HATF | | | |
| File Edit | | | |
| Primary group: BUXM | Type: Capacitor | Name: HATF | |
| In service: 23-Jul-1967 00:00 | Out of service: | Last edit: | |
| Position X: | Position Y: | | |
| Owner #: GE345123 | Spec #: 67-spc-123 | Serial #: 677889 | |
| Description: Buxmaillian Substation 11.5 Bank | | | |
| Comment: Blows cans frequently – proximity to smelter | | | |
| Nominal MVAr: 10.90 | Voltage sensitivity: 0.95 | AVR delay: 01:30 | |
| [Add] [Replace] | [Network] | [Measurements] | |

Dispatcher Brewer, Kathy

File  Edit

Primary group: [            ]    Type: [Dispatcher]    Name: [Brewer, Kathy]

In service: [26-Jun-1972 00:00]    Out of service: [            ]    Last edit: [04-Apr-1992 14:18]

Position X: [            ]    Position Y: [            ]

Owner #: [81891]    Spec #: [            ]    Serial #: [            ]

Description: [            ]

Comment: [Normally assigned to Eastern Division; has worked Western Division]

Initials: [KLB]    Login name: [BREWER_KL]    Password: [TEQUILA]

[Add]  [Replace]  [Network]  [Measurements]

TowerType APL 500

File   Edit

| | | | |
|---|---|---|---|
| Primary group: | Specification | Type: | TowerType |
| In service: | | Out of service: | |
| Position X: | | Position Y: | |
| Owner #: | | Spec #: | |
| Description: | | | |
| Comment: | | | |

Name: APL 500
Last edit:
Serial #:

| Circuit 1 | A phase | B phase | C phase | Ground | Circuit 2 | A phase | B phase | C phase | Ground |
|---|---|---|---|---|---|---|---|---|---|
| Height: | 28.05 | 28.05 | 28.05 | 37.96 | Height: | 0.00 | 0.00 | 0.00 | 37.96 |
| Offset: | -9.22 | 0.00 | 9.22 | -6.17 | Offset: | 0.00 | 0.00 | 0.00 | 6.17 |

Add   Replace   Network   Measurements

Set Winding

Name: TR5H          ☐ LTC

| Rating MVA | Voltage kV | Tap steps |
|---|---|---|
| Rated: 80.00 | Nominal: 138.00 | Low: 0 |
| Short term: ∧ | Neutral: 141.50 | Neutral: 0 |
| Emergency: | BIL: | High: 0 |
| | | Size %: |

[Apply]   [Cancel]

FIG. 20

Set Tap Setting

| | | | |
|---|---|---|---|
| Winding 1: | TR5L ☐ | tap: | 0 |
| Winding 2: | TR5H ☐ | tap: | 0 |
| Winding 3: | ☐ | tap: | 0 |

Source

|  | R1% | Z1% | R0% | Z0% |
|---|---|---|---|---|
| W1 – W2 | 0.5600 | 13.1300 | | |
| W2 – W3 | | | | |
| W3 – W1 | | | | |

|  | R1% | X1% | R0% | X0% |
|---|---|---|---|---|
| W1 | 0.5600 | 40.3800 | | |
| W2 | | | | |
| W3 | | | | |

Apply  Cancel

FIG. 21

Set Location

Co-located Objects

| Group | Type | Name |
|---|---|---|
|  |  |  |
|  |  |  |
|  |  |  |

Contact: Joseph P. Blow      Phone: 672-8640      Combination: 696

Address: 1234 Ridgemont Drive

Anywhere, USA 98012

Comment: Heavily wooded area, low lighting (carry your flashlight).

[Apply]  [Cancel]

METHOD FOR MODELING A PHYSICAL SYSTEM OF ELEMENTS USING A RELATIONAL DATABASE

CROSS-REFERENCE TO RELATED APPLICATION

This application is a continuation of U.S. patent application Ser. No. 07/941,366 filed Sep. 1, 1992, now abandoned.

BACKGROUND OF THE INVENTION

1. Technical Field

The present invention relates to object-oriented systems analysis. More particularly, the present invention relates to an object-oriented information model based on an underlying physical system, including associated infrastructure and personnel, for example the equipment which makes up an electric utility power system.

2. Description of the Prior Art

Electrical power systems are large complex physical systems with many types of interconnected electrical equipment. Such systems are often modeled for various reasons within the departments that make up the utility which is responsible for operating the power system.

Each department within the utility typically maintains its own specific database, usually employing a proprietary application program. This proprietary application program is tightly coupled to a particular operating system, computer manufacturer, data structure, etc. That is, the proprietary application programs employed in the various departments of the utility are vendor specific and cannot be interfaced with or exchange data with the application programs used in other departments (and often with those within the same department). Thus, in a utility, information is not freely exchangeable between the various departments of the utility, such as planning, engineering, operations etc.

The present state of the art is such that the various proprietary application programs are, at best, difficult for a department to use and maintain. That is, the user interface in most such programs requires the manipulation of strings of raw data, or the entry of data into crude forms. Thus, highly skilled personnel are required for the performance of a tedious and repetitive task.

Additionally, known database structures as are employed in such application programs merely provide virtual models of a power system based on abstract mathematical descriptions of system equipment. Such models are generic approximations of actual installed equipment within the power system. Thus, there is an inherent error in the model. When the error that is present in several separate databases within the utility is considered, it can be seen that the cumulative error renders data collection and reporting within a utility a Tower of Babel.

Accordingly, the utility is faced with occupying its personnel with the many problems attendant with such application programs: redundant entry of the same data in different formats, inconsistent and inaccurate local departmental models, stale data as information within one department does not track other departments, slow response on a system level to equipment changes, etc., all in the context of many complex application programs that are difficult and expensive to use and maintain.

SUMMARY OF THE INVENTION

The present invention is an object-oriented information model of a physical system, including associated infrastructure and personnel, such as an electrical power system. The preferred embodiment of the invention provides a single, comprehensive description of the equipment in a power system, including network topology, operational constraints and limits, telemetry and communication details.

The organization of information in the power system data model is derived from an object-oriented analysis of the power system. In the invention, physical pieces of equipment are represented as objects with attributes that can be verified (primary data) and relations, including connectivity, grouping, and location.

The user interface provided by the present invention is based on a windowing environment. Where possible, data input is a matter of selection from a set of recognizable elements contained within the system. In this way, entry error is significantly reduced.

The present invention also provides interfaces to existing application program databases. Import interfaces allow existing data to be captured. Export interfaces allow continuing support of base application programs by the present invention. Accordingly, the present invention provides a single, easy to use source for all proprietary application program databases at a utility.

BRIEF DESCRIPTION OF THE DRAWINGS

FIG. 7 is a pictorial view of a user interface window showing a data entry screen for a substation object type according to a preferred embodiment of this invention.

FIG. 8 is a pictorial view of a user interface window showing a data entry screen for a capacitor object type according to a preferred embodiment of this invention.

Figure 9:
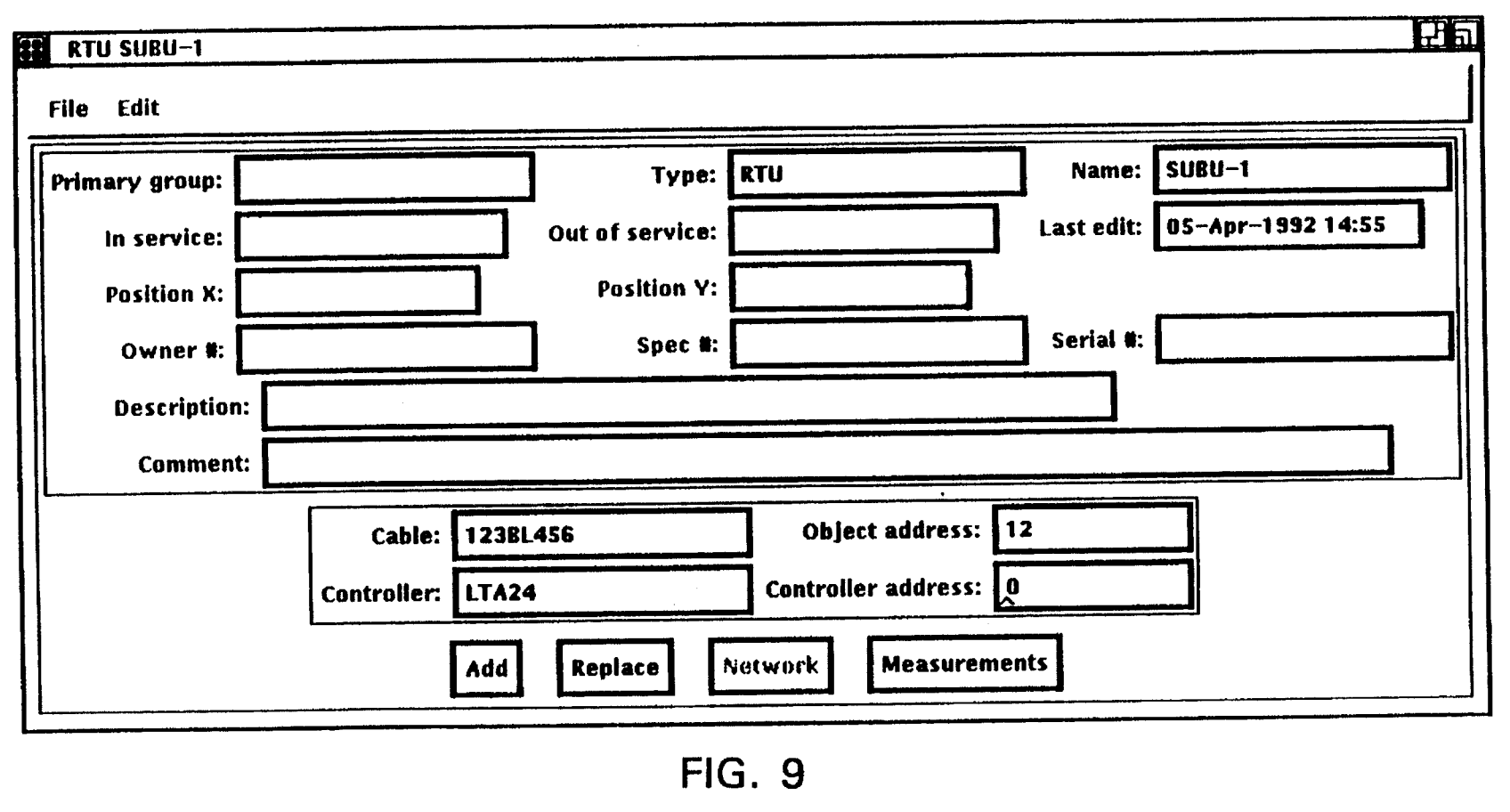

FIG. 9 is a pictorial view of a user interface window showing a data entry screen for an RTU object type according to a preferred embodiment of this invention.

Figure 10:
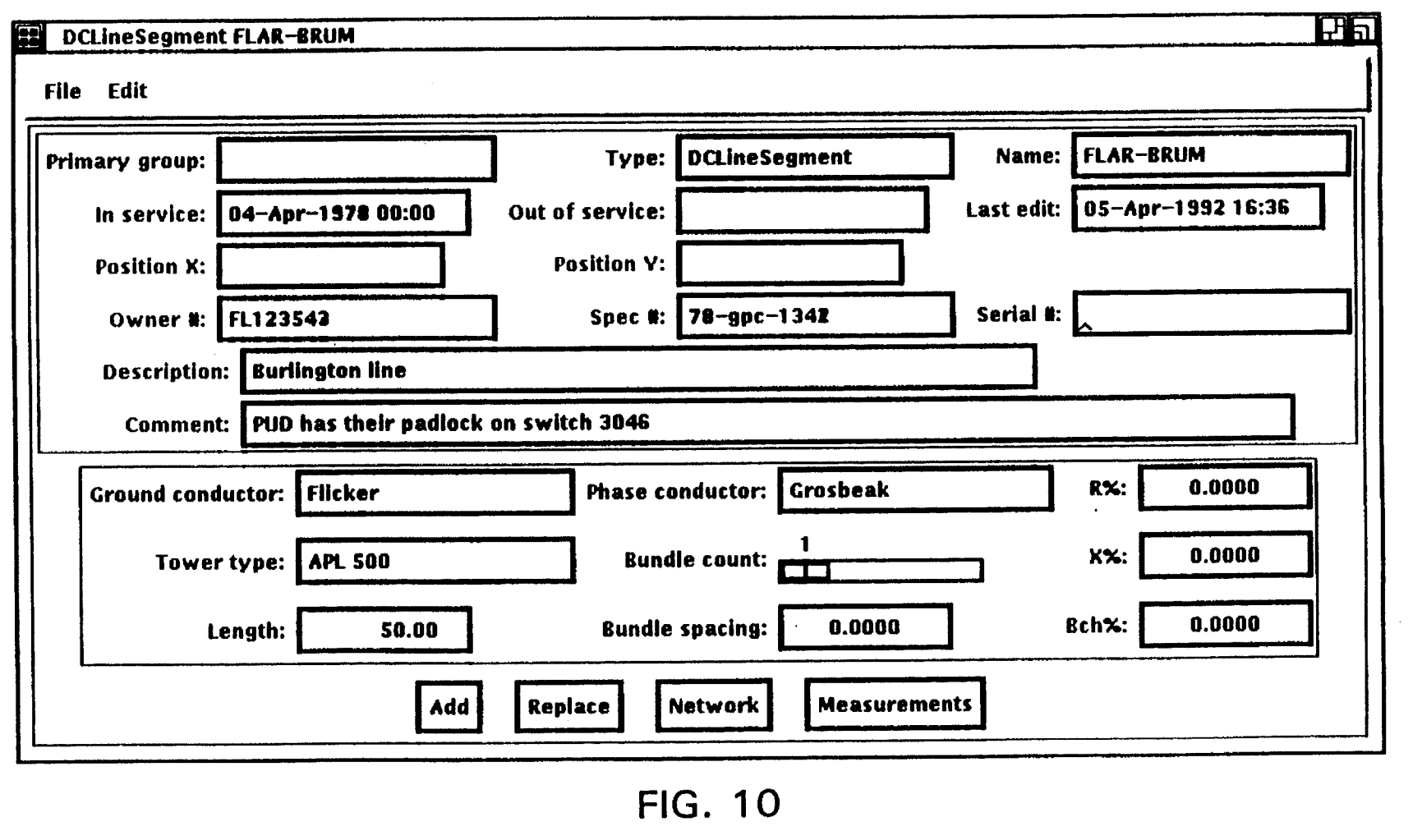

FIG. 10 is a pictorial view of a user interface window showing a data entry screen for a direct current line segment object type according to a preferred embodiment of this invention.

Figure 11:
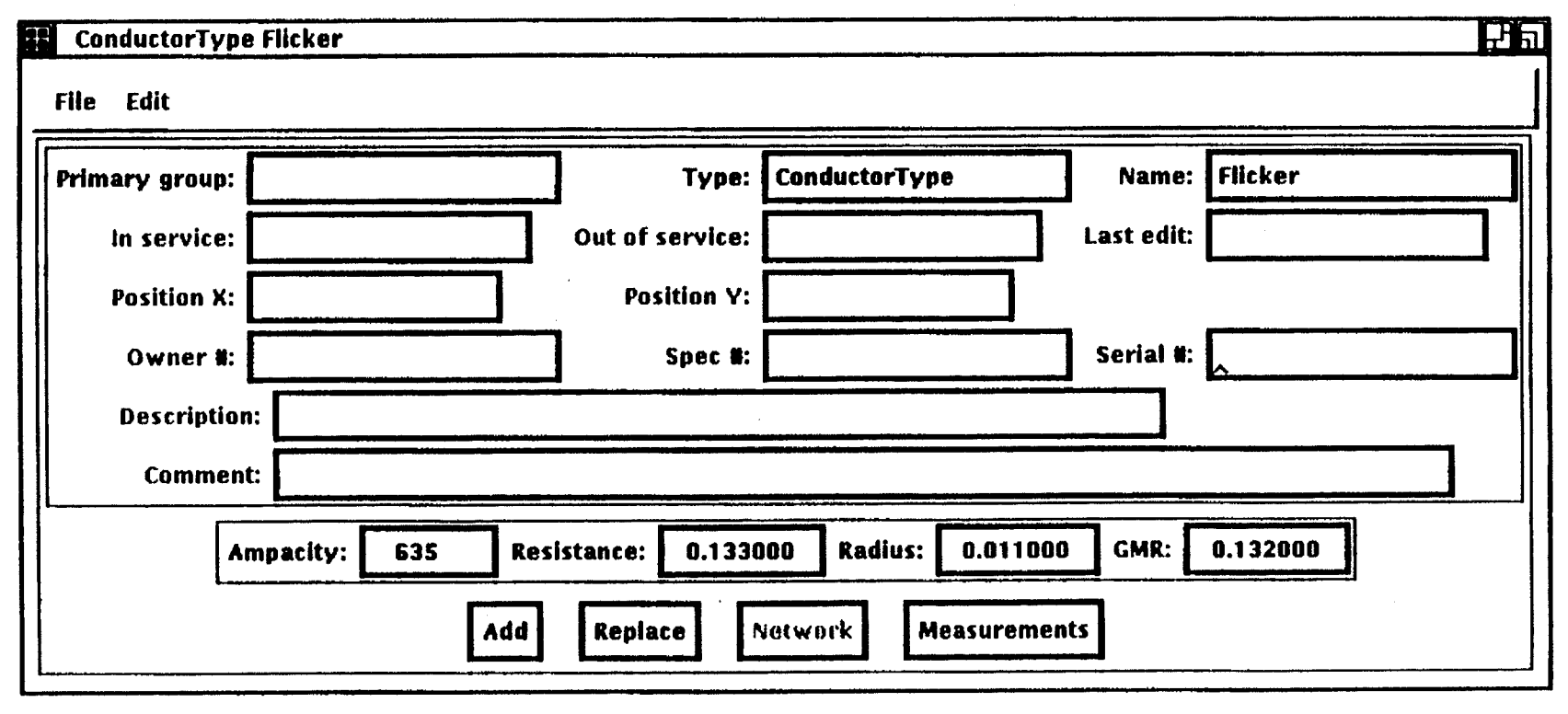

FIG. 11 is a pictorial view of a user interface window showing a data entry screen for a conductor object type according to a preferred embodiment of this invention.

Figure 12:
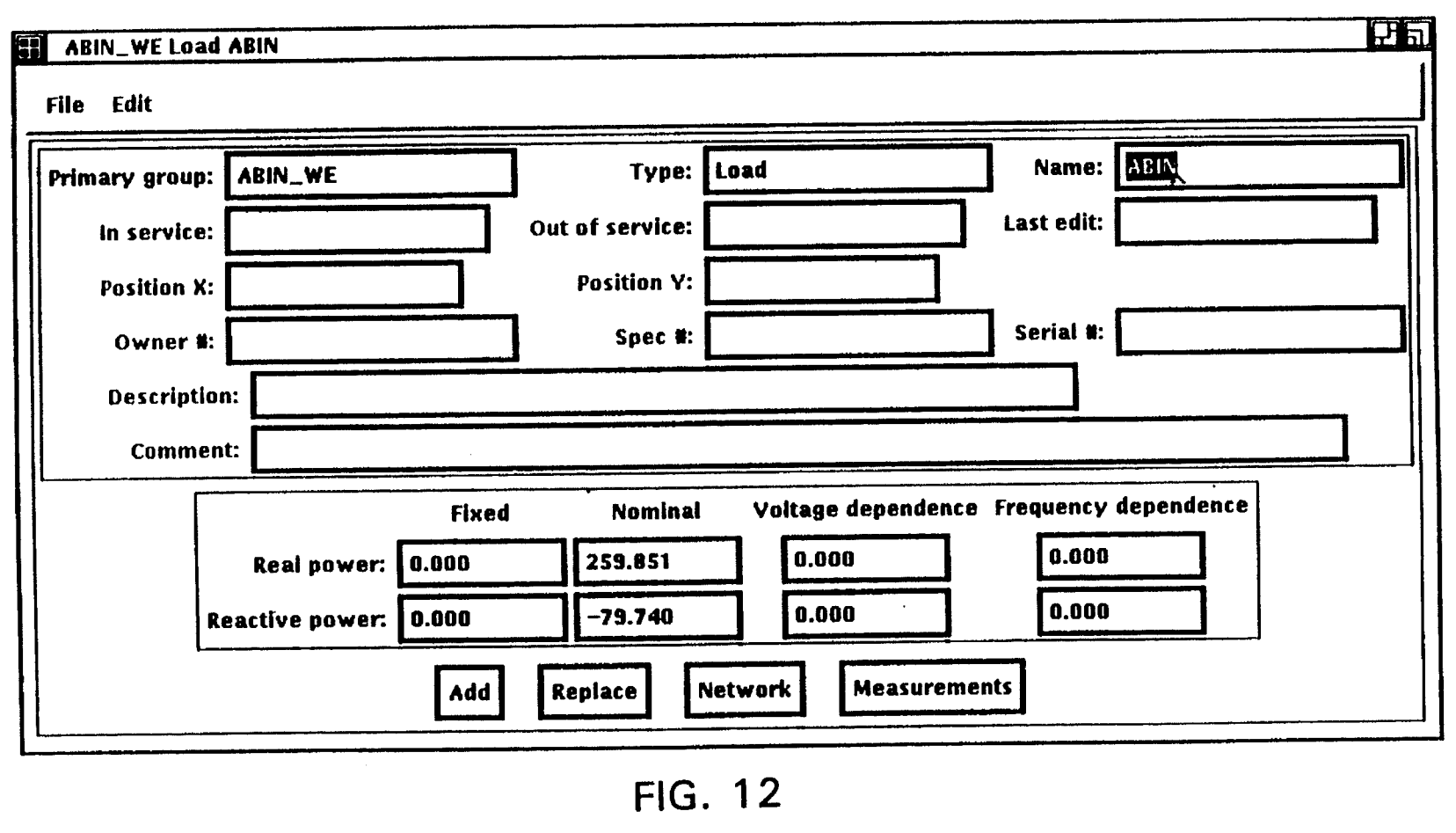

FIG. 12 is a pictorial view of a user interface window showing a data entry screen for a load object type according to a preferred embodiment of this invention.

Figure 13:
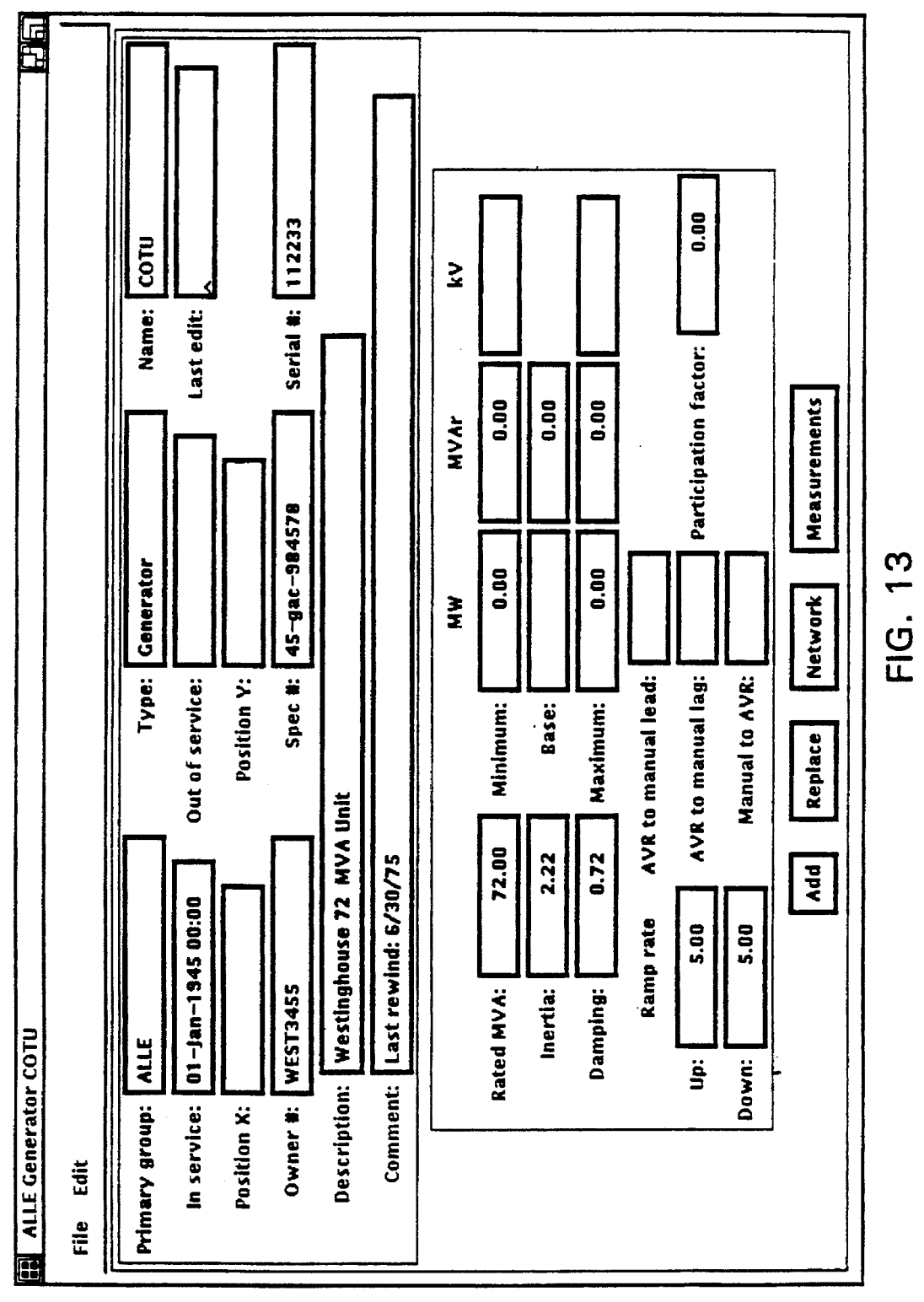

FIG. 13 is a pictorial view of a user interface window showing a data entry screen for a generator type according to a preferred embodiment of this invention.

FIG. 14 is a pictorial view of a user interface window showing a data entry screen for a dispatcher type according to a preferred embodiment of this invention.

Figure 15:
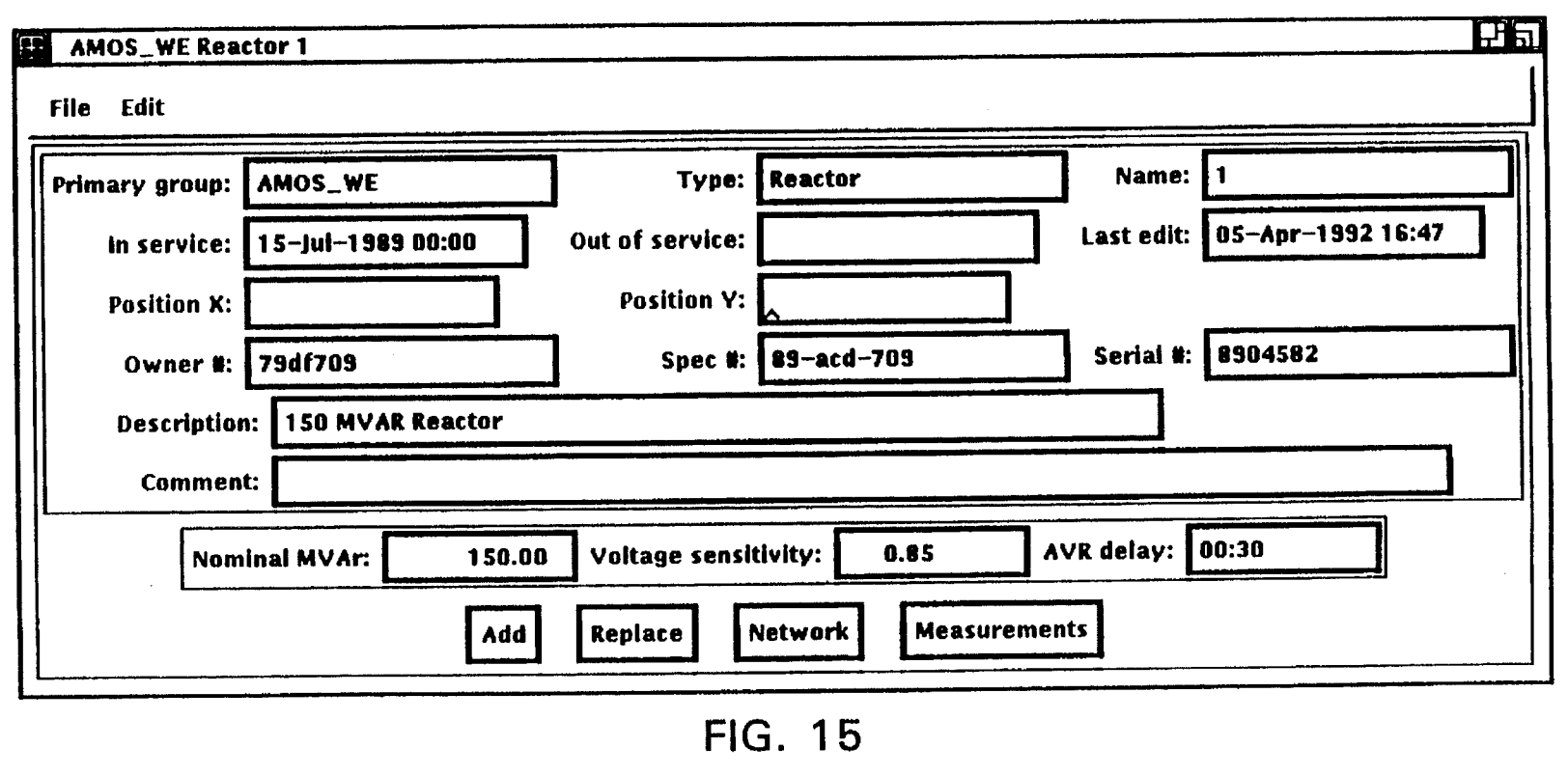

FIG. 15 is a pictorial view of a user interface window showing a data entry screen for a reactor type according to a preferred embodiment of this invention.

Figure 16:
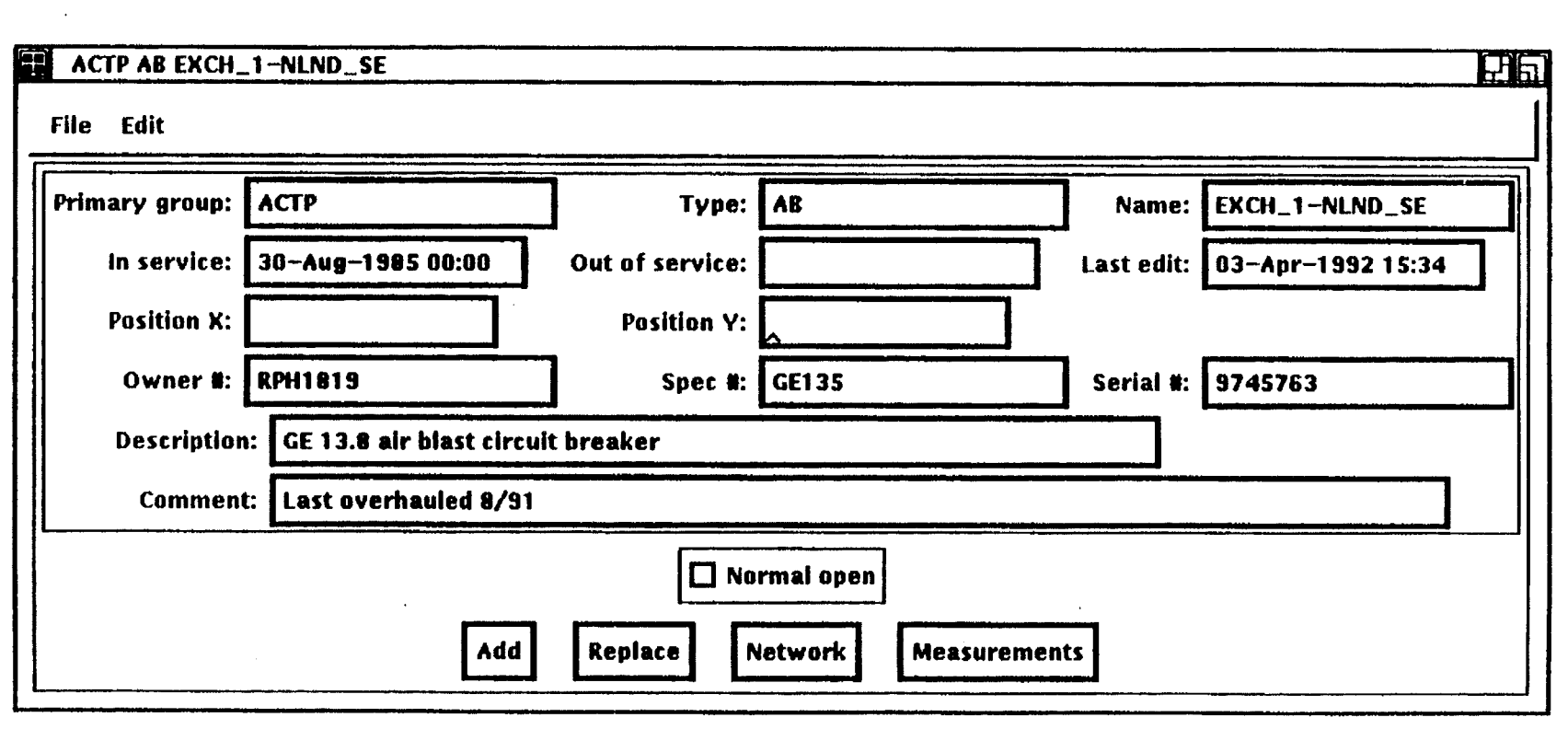

FIG. 16 is a pictorial view of a user interface window showing a data entry screen for a circuit breaker object type according to a preferred embodiment of this invention.

Figure 17:
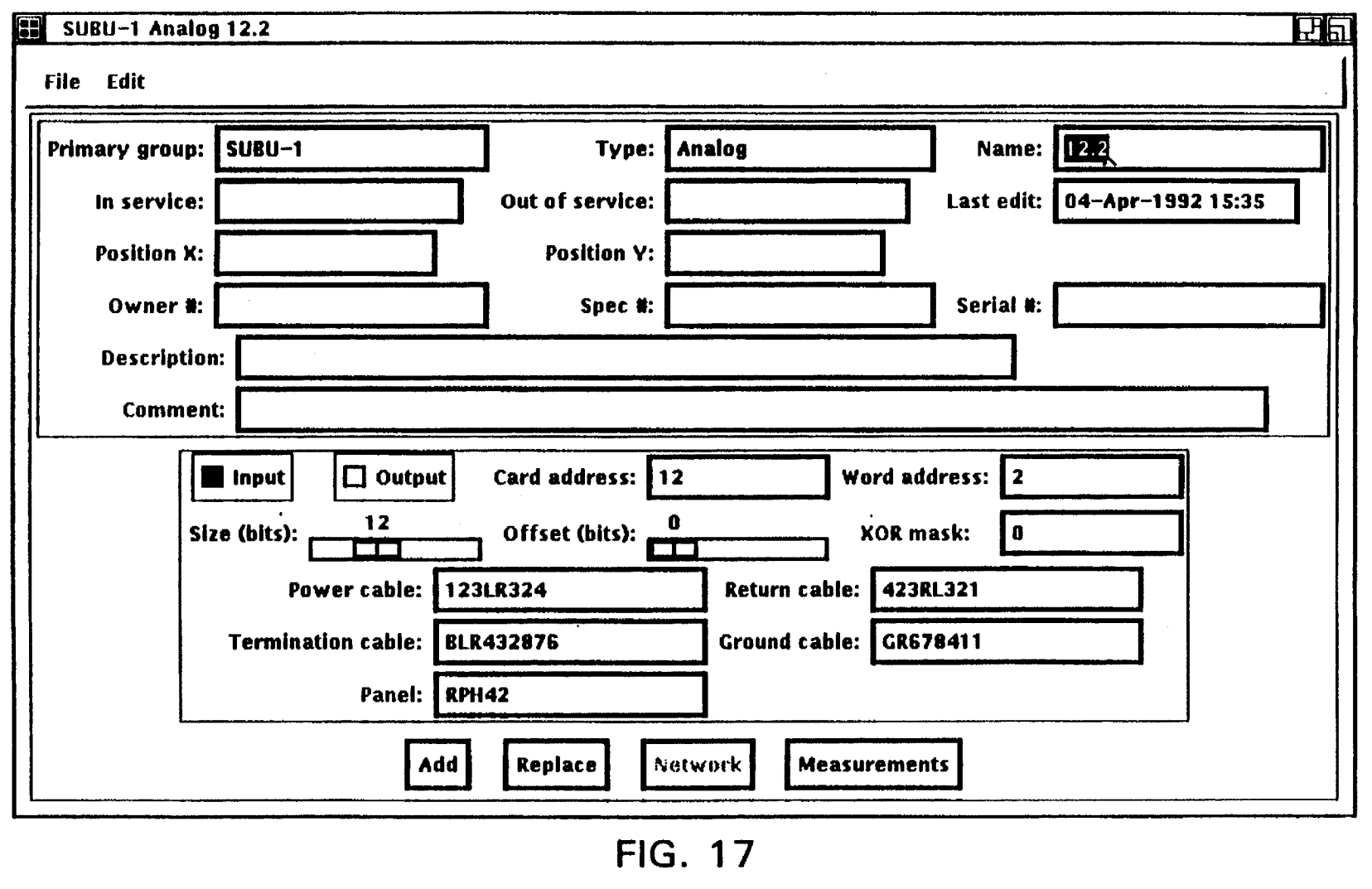

FIG. 17 is a pictorial view of a user interface window showing a data entry screen for an analog telemetry object type according to a preferred embodiment of this invention.

FIG. 18 is a pictorial view of a user interface window showing a data entry screen for a tower object type according to a preferred embodiment of this invention.

Figure 19:
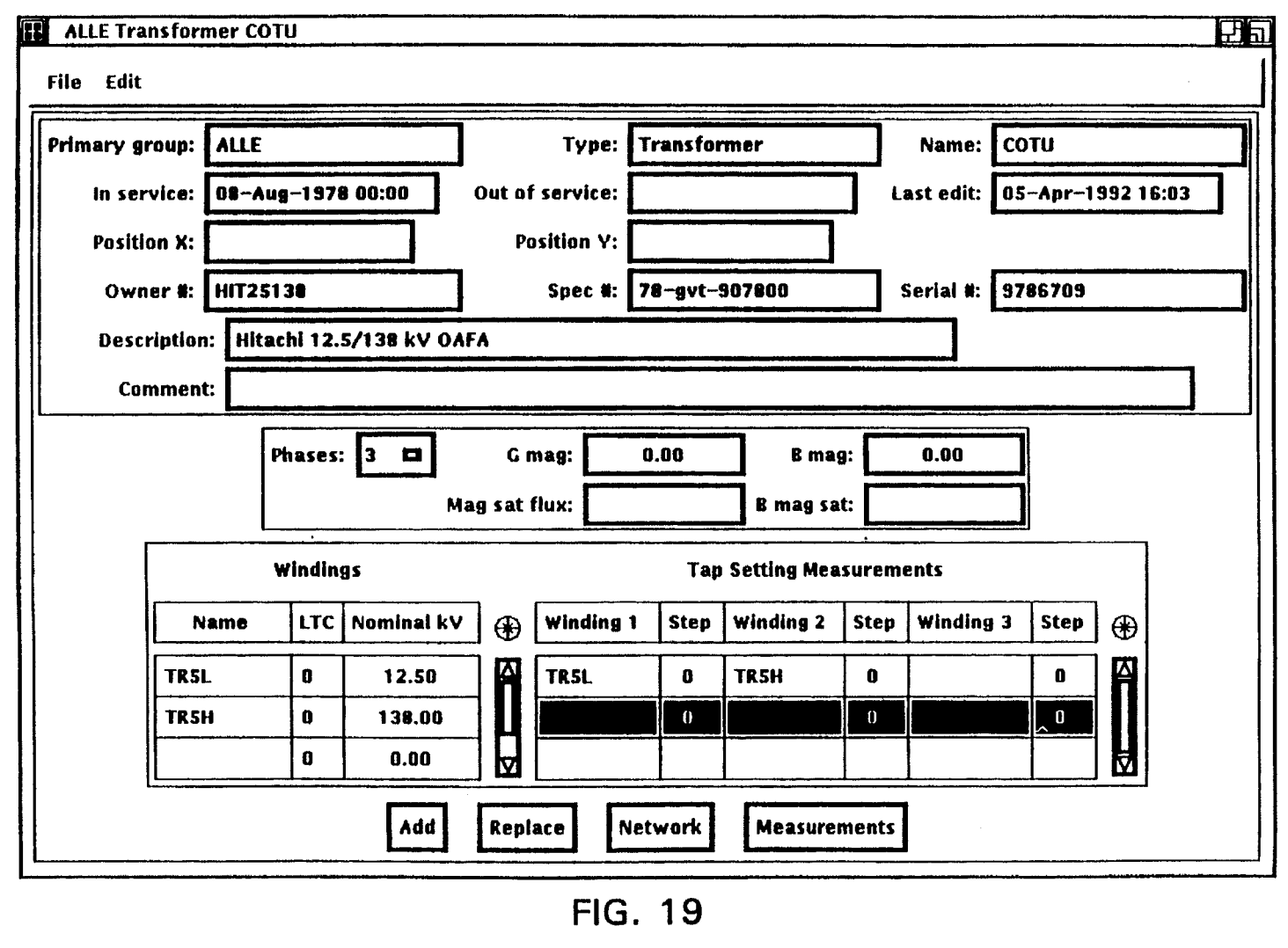

FIG. 19 is a pictorial view of a user interface window showing a data entry screen for a transformer object type according to a preferred embodiment of this invention.

FIG. 20 is a pictorial view of a user interface window showing a data entry screen for a winding setting object type according to a preferred embodiment of this invention.

FIG. 21 is a pictorial view of a user interface window showing a data entry screen for a tap setting object type according to a preferred embodiment of this invention.

FIG. 30 is a pictorial view of a user interface window showing a data entry screen for an object location setting menu according to a preferred embodiment of this invention.

Figure 31:
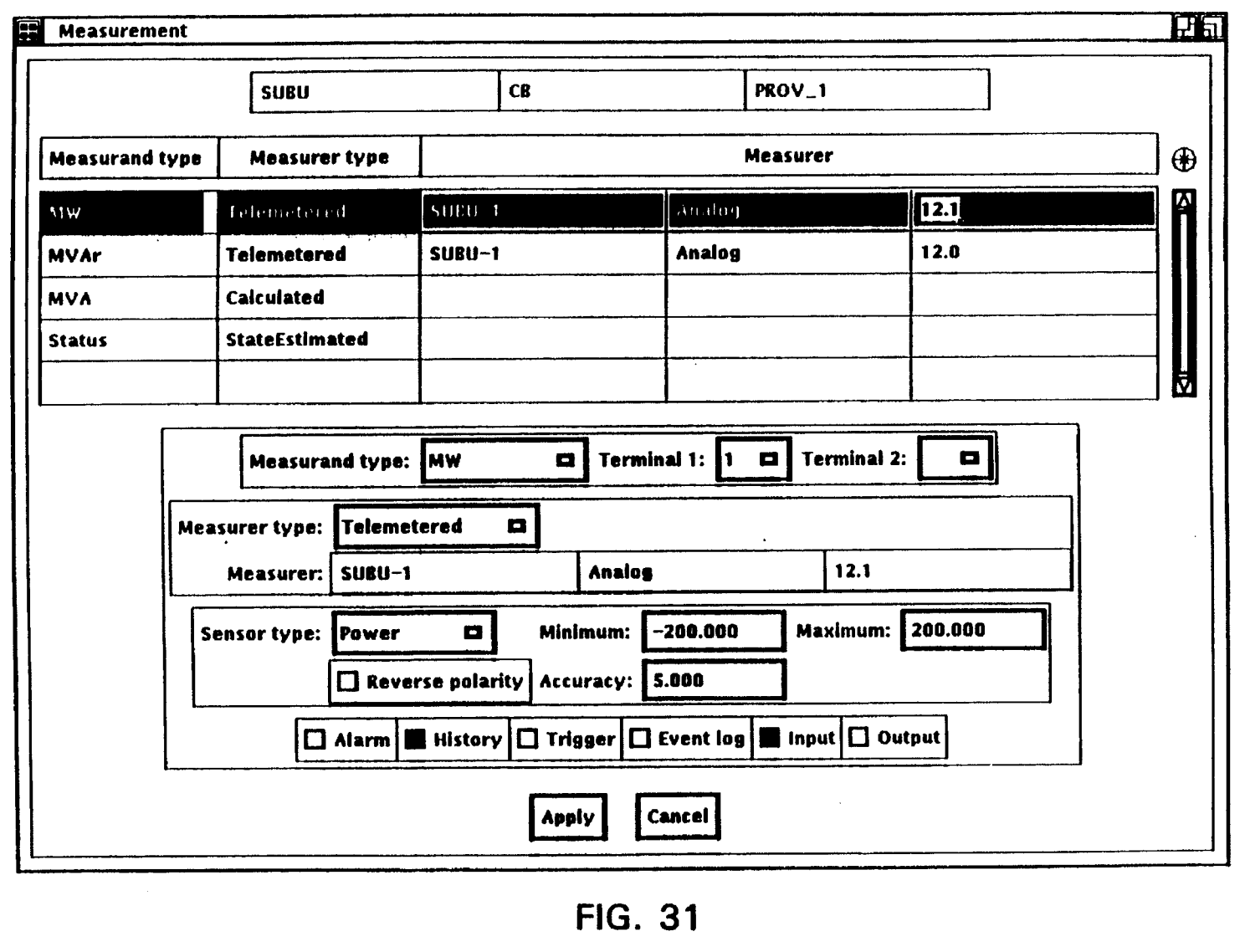

FIG. 31 is a pictorial view of a user interface window showing a data entry screen for an telemetry measurement menu according to a preferred embodiment of this invention.

DETAILED DESCRIPTION OF THE INVENTION

Figure 1:
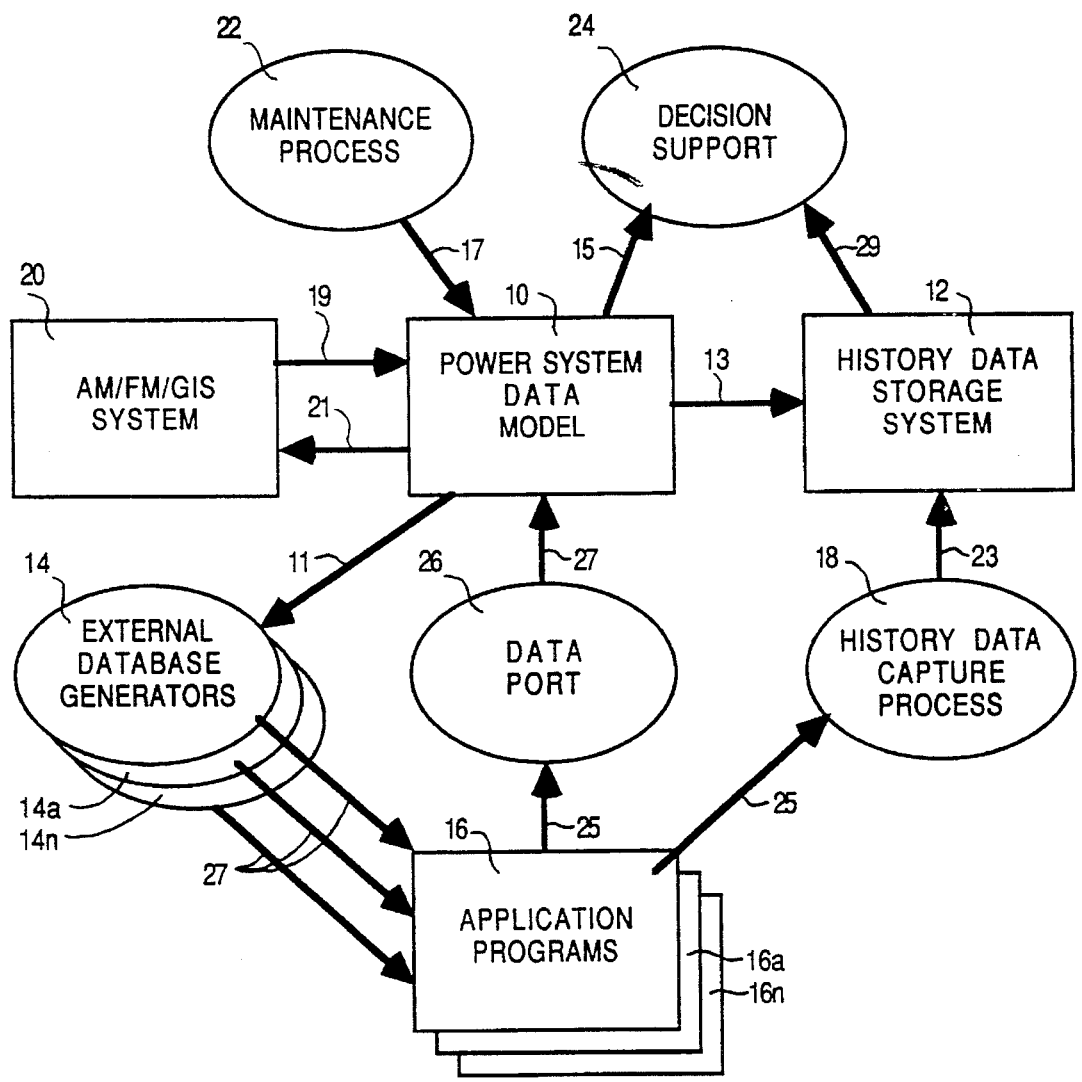
FIG. 1 is a data flow diagram of an information model in accordance with the present invention.

The present invention is best understood by referring to the Drawings in connection with review of this Description.

Power System Data Model

The present invention provides a database that finds application, for example, in the electric utility industry to hold attribute and connectivity data for electrical power system equipment. The invention reduces duplication of data and, through import and export capability, provides a single point of maintenance for the operations, planning, engineering, information services, and other departments of the electric utility. This feature of the invention eliminates the need to maintain multiple application program databases within the utility by replacing the multiple databases with a single, comprehensive point of maintenance.

The power system data model of the present invention allows the utility to define and maintain connectivity information for electrical equipment. The present invention has an information flow, as shown in block diagram form in FIG. 1, that provides a central repository of information about the equipment which forms the electrical generation, transmission, and distribution network of the electric utility. This central repository is referred to in FIG. 1 as the power system data model 10.

The power system data model is implemented in a relational database. The power system data model provides a data transfer path 11 for information transfer, including attribute and connectivity information. This information is transferred to a process 14 which generates input files. These input files are in turn exchanged, as indicated by the information transfer path 27, with the proprietary application program databases 16 that are used by the various departments within the utility, e.g. design, analysis, planning, operations, and real-time software applications, including supervisory control and data acquisition (SCADA), distribution automation (DA/DMS), Energy management systems (EMS), and dispatcher training simulators (DTS).

The invention replaces the need to maintain multiple proprietary application program databases with a single, comprehensive point of maintenance in the power system data model 10. The external database generator 14 (14a–14n) uses the power system data model 10 to create data exchange files which contain attribute data in an appropriate format to populate any of several proprietary databases 16 (16a–16n) for use by operations, engineering, or other applications.

For example, an electrical utility Energy Management System may integrate real-time and analysis applications from several different vendors, each vendor having a different proprietary database. In such system, the maintenance associated with electrical network modeling is performed by the present invention. The data exchange files are transferred from the power system data model (exported) to the host system for the target database.

A data transfer path 25 is provided which allows information from the various proprietary databases to be imported to the power system data model through a data port 26. The data port receives existence, attribute, and connectivity information from the proprietary database and provides this information along a data transfer path 27 to the power system data model.

An historical data storage system 12 is included in the preferred embodiment of the invention that is capable of storing timed samples (i.e. minimum, maximum, and average values every thirty seconds), continuous records (i.e. alarm and event logs), and snapshots (i.e. current system state) for later analysis. Such samples are provided along a data transfer path 23, which transfers information that is captured by an historical data capture process 18. The historical data capture process is in turn part of a data transfer path 25, which provides information to the historical data capture process from the various application programs 16 (16a–16n). The historical data storage system uses the power system data model 10, as shown by the data transfer path 13, to analyze historical data within the context of the power system.

The database design is easily extensible such that the power system data model can be expanded to encompass an enterprise data model. Thus, connections may be provided to external databases for AM/FM, GIS, and corporate computer systems.

For example, in some embodiments, the invention may operate in conjunction with an AM/FM/GIS system 20, in which existence and connectivity (described further below) establish one data transfer path 19 to the power system data model, and in which attributes establish another data transfer path 21 with regard to the power system data model.

The invention may be operated in a client-server environment including data servers, transaction managers, client applications, and user interface servers. Thus, a data server may be used to serve data to all interested users (clients). For example, user clients who are located throughout the power system network, a resource manager for the databases, and a transaction manager for a distributed database system may all be served by data servers. A key point of the present invention is that the server provides a single (logical) model of the power system. Thus, there is only one comprehensive and consistent model of the power system, but that model may be distributed and/or replicated for better access throughout the power system network.

The invention provides processes both for interactive maintenance 22, having an attribute data transfer path 17, and for decision support 24, having an attribute/connectivity data transfer path 15 and a past performance data transfer path 29.

The present invention is implemented in relational database technology. Thus, relational tools are applied to data maintenance where traditional proprietary databases usually offer a user very little help, that is, in the areas of SQL access, ad-hoc queries, report generation, network access, and decision support. The present invention may be implemented using known database programming techniques. See, for example, *Object-Oriented Systems Analysis,* Shlaer and Mellor, Yourdon Press (1988) for a discussion of relational database techniques that are applicable in implementing the present invention.

Objects

The present invention is based on extending relational database technology and object-oriented systems analysis to a power system model. In object-oriented systems analysis, abstractions are produced that correspond to sets of physical things. These things are referred to as objects. Each object has a set of attributes which describe the object's characteristics (discussed more fully below). A specific occurrence of an object, in which the object's attributes are populated with data, is referred to as an instance. All instances within a set of instances have the same characteristics and are subject to and conform to the same rules of behavior. Referential attributes are used to maintain the relationships between different objects.

The information model of the present invention describes:

objects attributes of those objects;

relationships between objects; and behavior of the object.

An object is an abstraction of a set of real-world things, i.e. underlying physical equipment, etc, such that:

all real-world things in the set (the instances) have the same characteristics; and all instances are subject to and conform to the same rules and behavior.

Objects can be tangible things, roles, events, interactions, and specifications. Examples include:

Tangible things: transformers, switches, lines;

Roles: operators, dispatchers;

Events: incidents, alarms, trouble calls, plans, schedules;

Interactions: connections, measurements, groupings, correlations; and

Specifications: equipment models, validation lists.

Lists of objects may be generated using a grouping mechanism to view the contents of the user-defined interactions, as well as lists of all the groups to which any single object belongs. Lists can also be generated using ad-hoc queries with pattern matching of object names.

An object is named based on the following criteria: common names are preferred, the names should be 'strong' names, the names should have the same dimension and be precise, the names should be based on the object's essential nature, and the name may be content based.

One aspect of the present invention provides a power system data model which is derived using an object-oriented analysis of a power system. The model represents the physical types of equipment and their connectivity. The model contains rules that maintain referential and electrical integrity and which simulate the behavior of the power system.

The power system data model defines the existence of and assigns unique keys to equipment in the power system. Based on object-oriented systems analysis, the preferred embodiment of the power system data model describes four main types of equipment (described more fully below): conducting equipment, sensing equipment, computer equipment, and support equipment. Relationships between equipment items are modeled, as are groupings that may be imposed by utility specific conventions.

Types

Typing is used in the present invention to enhance the description of an object in the database. For equipment in the power system, typing is used to define a classification scheme that identifies the exact type of equipment to a degree of resolution defined by the end user. The same technique is used to identify other types of objects in the invention.

In the invention, supertypes and subtypes are used to categorize objects that are usually classified in a hierarchy. Thus, subtypes and supertypes are used to capture similarities between classes of things in the real world, including attributes and behavior. Subtypes and supertypes are used initially to model separate objects and then to 'bubble up' the common attributes. This procedure establishes a type hierarchy which is used as a framework for the power system data model. In establishing subtypes and supertypes a bottom up system analysis is employed. Thus, the starting point is each physical element in the system.

A subtype is a more specific description of a parent supertype. A subtype therefore contains all properties possessed by its supertype. Thus, the attributes of a subtype are a property of a supertype object. For example, if all the subtypes of Switch have attributes describing their most recent state and normal state (Open or Closed), these attributes can be assigned to the switch object. They are then 'inherited' by all the objects that are a subtype of Switch. Other attributes may be common across many types of objects (e.g. manufacturer; location). These attributes may be moved up into classification objects, such as Conducting Equipment.

The present invention provides for three kinds of types:

system types;

user application types; and user types.

System types are pre-defined and may not be modified because they are necessary and fundamental to the correct operation of the power system model. User application types are used by user-written applications to define well known or reserved types. User types are defined and modified as necessary to express the desired depth of classification.

The three kinds of types are best understood as graphically depicted as follows:

| Key Value | Type |
|---|---|
| 1k–10K | Systems |
| 10k–20k | Users |
| . | |
| . | |
| 900k–1000k | |
| 1 M–1.01 M | User-defined |
| . | |
| . | |
| 999.99 M–1000 M | |

Each new type must be related to a previously defined type. This relationship forms a supertype-type hierarchy. The hierarchy supports an unlimited number of levels but each type has one and only one supertype.

For example, a particular type of switch, e.g. a minimum oil circuit breaker, would be 'typed' by application of the invention as follows:

| | |
|---|---|
| 1. Object | All things are objects. |
| 2. Equipment | It is a piece of real equipment... |
| 3. Conducting Equipment | ...that is a part of the power sytem. |
| 4. Switch | It is a switch and... |
| 5. Breaker | ...it can break load and... |
| 6. CB | ...it is a circuit breaker and... |
| 7. Oil CB | ...it is an oil circuit breaker and... |
| 8. M-OCB | ...it is a minimum oil circuit breaker. |

The invention defines types (Object, Equipment, Conducting Equipment, and Switch, above ) that are used to allow the power system data model to interpret the type of object that is modeled. The user defined types (Breaker, CB, Oil CB, and Minimum-Oil CB, above) allow interactive users and user written applications to alter model behavior based on the type.

These types are depicted graphically as a hierarchy of types where the lower levels are subtypes. The four main types of equipment—conducting equipment, sensing equipment, computer equipment, and support equipment (discussed below)—are supertypes of the other equipment types, which may, in turn, be supertypes of still other types.

One unique aspect of the present invention also provides for basetypes (or fundamental types), i.e. a formalized point in the type hierarchy that encompasses a number of similar subtypes (similar in attributes and behavior). The preferred embodiment of the present invention provides Breaker, Fuse, and Disconnect as base types, for example. All are subtypes of Switch (which could also be a basetype). Base types are used to map objects for editors, database tasks, and for procedures that model behavior. For example:

Switch

Breaker (capable of interrupting load and reclosing)
>OCB, M-OCB, VCB, ABCB, GCB Fuse (capable of interrupting load)
>Current limiting, power, cutout, vacuum Disconnect (not capable of interrupting load)
>Station, transmission, distribution Attributes Once the components of a power system and the arrangement of these components is set forth in terms of object-oriented analysis, the objects are assigned attributes. An attribute is the abstraction of a single characteristic possessed by all the things that were abstracted as objects. In the invention, it is preferred that attributes be collected for each of the objects identified. During this process, some of the attributes assigned to a group of objects are shared in common.

The invention provides for obtaining a set of attributes for objects, where the attributes are:

complete: they capture all the information pertinent to the object they define;

fully factored: each attribute captures a separate aspect of the object abstraction; and mutually independent: the attributes take on their values independently of one another.

Attributes are assigned to four different categories depending on the type of information they capture:

descriptive: intrinsic characteristics of an object, which are further divided into two categories, i.e.:

primary: usually physically verifiable by observation, e.g. line length, tower type, conductor type; and secondary: not usually physically verifiable, but rather derived from others in the database by calculations that model behavior, e.g. impedance and capacitance;

naming: arbitrary names and labels, e.g. line name;

referential: facts that relate an instance of an object to an instance of another object, e.g. manufacturer, location (implemented using surrogate keys, discussed below); and identifiers: a set of one or more attributes that can uniquely identify an instance of an object, e.g. line name, segment name.

Attributes that can be derived from the primary data may be calculated automatically. For example, the primary data for a transformer is entered directly from the nameplate or test report. Individual winding characteristics are derived from this information. Transmission line impedances and admittances are derived from the primary data of conductor characteristics, tower geometry, and line segment lengths. Derived data may be input in lieu of primary data, if desired.

One unique aspect of the present invention is the use of two types of descriptive attributes. Thus, one goal of the present invention is to calculate secondary attributes where possible. Otherwise, direct entry of the attribute is employed. In this way, the present invention allows the modeling of system behavior.

Groups

Objects may be related to each other by assigning them to groups. Any particular object may belong to any unlimited number of different groups, although each object has a single primary group. Groupings are arbitrary collections of objects. Groups have meaning only as specified by the user. The objects in a group are related because they are member of (belong to) the same group. Groupings are modeled as relationships that may be imposed by utility specific conventions.

Relationships are abstractions of a set of associations that hold systematically between different kinds of things in the real world. There are an infinite number of relationships between types of things in a power system (and a large number of things themselves). Prior art approaches to modeling power systems express each relationship individually, resulting in unwieldy database structures. In the present invention, relationships may be:

one-to-one;

one-to-many; and many-to-many.

For example:

a substation contains equipment;

telemetry monitors equipment;

lines are composed of segments;

equipment may have a location;

electrical equipment is connected to electrical equipment;

electrical equipment may have ratings;

transformers have windings.

Additionally, relationships may be conditional or unconditional.

One unique feature of the present invention provides for the use of one table for all groupings (i.e. for all relationships, such as 'member of', 'located with', and 'shown on'). Typically, a database of the type described herein would rely on a separate table for each grouping relationship between each type of object.

Group-Member Relationship

The present invention contains a description of group-member relationship. Both the group and the member are objects in the database. Where a division belongs to a company, the group is an object of the type COMPANY, the member is an object of type DIVISION, and the relationship is BELONGS TO. Other relationships may include: LOCATED WITH, which can be used to locate switches on poles that have a known address; SHOWN ON, which relates objects to maps and drawings; RATED AS, which allows a common set of ratings to be held for a set of similar equipment; and LOAD MODELED BY, which allows a common load model to be applied to similar consumers.

The SYSTEM grouping holds references to all the objects that make up a version of the power system data model. Generational versions record the evolution of the equipment in the power system. Between two versions, the grouping mechanism duplicates only the references to objects common to both, not the objects themselves.

Additionally, objects may be stored as members of groups in at least two ways:

as an object: e.g. a transformer as a network position identifier: e.g. a position or place holder in the power system.

By assigning a dual nature to an object, the object itself may exist in the model, along with its attributes, and a place in the power system may be held into which objects having different attributes may be placed based on historical need. For example, a power system may have a network position identifier for a transformer. An object, i.e. a transformer having a particular rating, manufacturer, etc. may currently occupy that network position. Based on historical data, projected needs, etc., it may be determined that the network position occupied by the particular transformer should be occupied by a transformer having a different rating, etc. In this way, the power system data model (and, accordingly, the power system) is readily modified by equipment interchange based on demand, need, plan, etc. The historical data can also be applied to the object itself, allowing the history of a device to be analyzed.

Normalization Rules

The following normalization rules are provided by the invention which are applied to the attributes to ensure that the descriptions are coherent:

One instance of an object has exactly one value for each attribute;

Attributes cannot contain an internal structure; and

Every non-key attribute must be fully dependent on the primary key.

The normalization rules are similar to those normally applied to the design of a relational database. The first rule defines a 'table' in the relational database.

The second rule ensures that the attributes are fully factored. This is essential to avoid 'hard-coded' knowledge of the meaning of parts of an attribute (e.g. the first two digits of the equipment number represent the year of purchase).

The third rule refers to the use of 'keys'. In a database there must be a way of uniquely identifying anything in the database. In a hierarchical database this is accomplished by the combination of the name of the item plus the names of the parents of the item (e.g. Substation Foo, Transformer T1). In a relational database, each row in a table must have a key of its own. In some applications this is simple (e.g. the name of a substation—Foo); in others compound (e.g. a name constructed from the identifier plus those of its parents—Foo T1).

The fourth rule requires that every attribute that is not part of the identifier must represent a characteristic of the entire object, and not a characteristic of something that is identified by part of the identifier (e.g. the attributes of the transformer Foo T1 cannot include the location of the substation Foo). This rule also prevents the use of attributes that are identified by other attributes within the object (e.g. the transformer may have a manufacturer attribute, but it is incorrect to store the manufacturer's address as an attribute of the transformer).

Surrogate Keys

In the preferred embodiment of the present invention, the actual primary key is modeled as a surrogate key, which is a computer generated numeric key that has no meaning to users. A surrogate key allows the user to change the name of an incidence of an object but not change references. All referential attributes are based on surrogate keys. Other (secondary) keys can be used to access objects by name, and the uniqueness rules for these keys can be defined on a case-by-case basis.

One unique feature of the present invention provides for the use of a balanced binary tree index with sequential keys. Surprisingly, the use of this technique in the present invention, taking advantage of the fact that the database is primarily 'read', results in a much faster cycle time. Thus, the database is speeded up using a technique that would, by conventional wisdom, slow a database down.

Data Model

In summary, one aspect of the present invention provides a data model constructed in accordance with the following procedure:

Create an extensible type hierarchy, allowing a user to extend types down the hierarchy;

Collapse objects into tables, where attributes specific to all objects below base types are collapsed into type tables, and all objects above base types are collapsed into object tables:

Use typing to identify an object (not a table name); and

Use common object table with surrogate keys; and

Externalize and collapse relationships, where three main relationships are defined in the preferred embodiment of the present invention, i.e. connectivity, measurements, and groupings:

Use typing to identify the type and relationship.

The data model incorporates the following procedures and operations to ensure integrity:

Referential: to enforce constraints imposed by the database design, e.g. relationships between tables;

Validation: to evaluate against real-world criteria, e.g. use engineering rules of thumb to reject bad data; and Behavioral: to model behavior of equipment, e.g. calculate secondary/primary descriptive attributes, or split up load models.

These procedures are triggered when data is changed, e.g. SQL insert, update, delete statements, etc. The procedures cannot be bypassed by using a different user interface. This is vital for integrity and prevents the use of so-called 'back doors' to corrupt the database. These procedures may be turned off, e.g. for maintenance.

Triggers make the presence of various procedures transparent. Thus, a user would not be aware of the operation of the database. Rather, values are entered and results displayed. This is discussed in greater detail below.

Physical Model

An important aspect of the present invention is the use of a physical model. Thus, the descriptive attributes recorded for an object are verifiable. For example, control center applications may require the impedances for a three-winding transformer to be specified on a per-winding basis, corrected for the system base MVA and kV levels. These impedances cannot be validated by inspection. In the prior art, it is common practice to enter these values directly into the databases used by the specific application programs concerned. If the data from the manufacturer's test report are entered into the database of the present invention, then the application data can be calculated at any point in the system. This test data has a known provenance which can be checked if a question arises about the validity of the data.

Another example of the foregoing involves transmission line impedances. If the characteristics of conductor types and tower geometries are known, it is possible to calculate the positive sequence impedances from the primary data of the line length and construction. By adding more information about the ground resistivity and the relationships to other lines in the same right-of-way, zero sequence impedance can also be calculated.

The power system data model describes four main types of equipment: conducting equipment, sensing equipment, computer equipment, and support equipment. The following relationships are established between these four major types:

1. Sensing equipment→measures→conducting equipment;

2. Support equipment→supports→conducting equipment;

3. Conducting equipment→is connected to→conducting equipment; and

4. Computer equipment→controls and models→conducting equipment.

The main types of the conducting equipment are:

Conducting equipment→capacitor, switch, transformer, generator, conductor, reactor, consumer, etc.

The sensing equipment is assigned two major subtypes:

Sensing equipment→ protection: voltage relay, current relay, frequency relay, etc.; and telemetry: analog, digital, counter, control, etc.

The support equipment encompasses the equipment needed to keep the network in place:

Support equipment→ overhead: tower, pad, pole, etc;

underground: manhole, pit, vault, etc; and etc.

Computer equipment may be described as follows:

Computer equipment→ hardware: display, printer, etc;

software: program.

The relationships in the power system data model may be extended by the end user. Groupings are used to aggregate the equipment into larger units that reflect the utility's organization. For example, a utility may choose to define groups of equipment as follows:

Equipment group→system, company, division, substation, bay, line, circuit, etc.

A circuit breaker can belong to a bay that belongs to a substation that belongs to a division that belongs to a company. This is represented graphically as follows:

Company→division→substation→bay→circuit breaker.

The same circuit breaker may also belong to a transmission line which may belong to two different divisions of different companies.

That is,

Company 1→division 1→

Company 2→division 2→⇒transmission line→circuit breaker

These example groupings are specific to a particular utility. Each database user can choose different groupings to accurately reflect the utility's organization.

Figure 2:
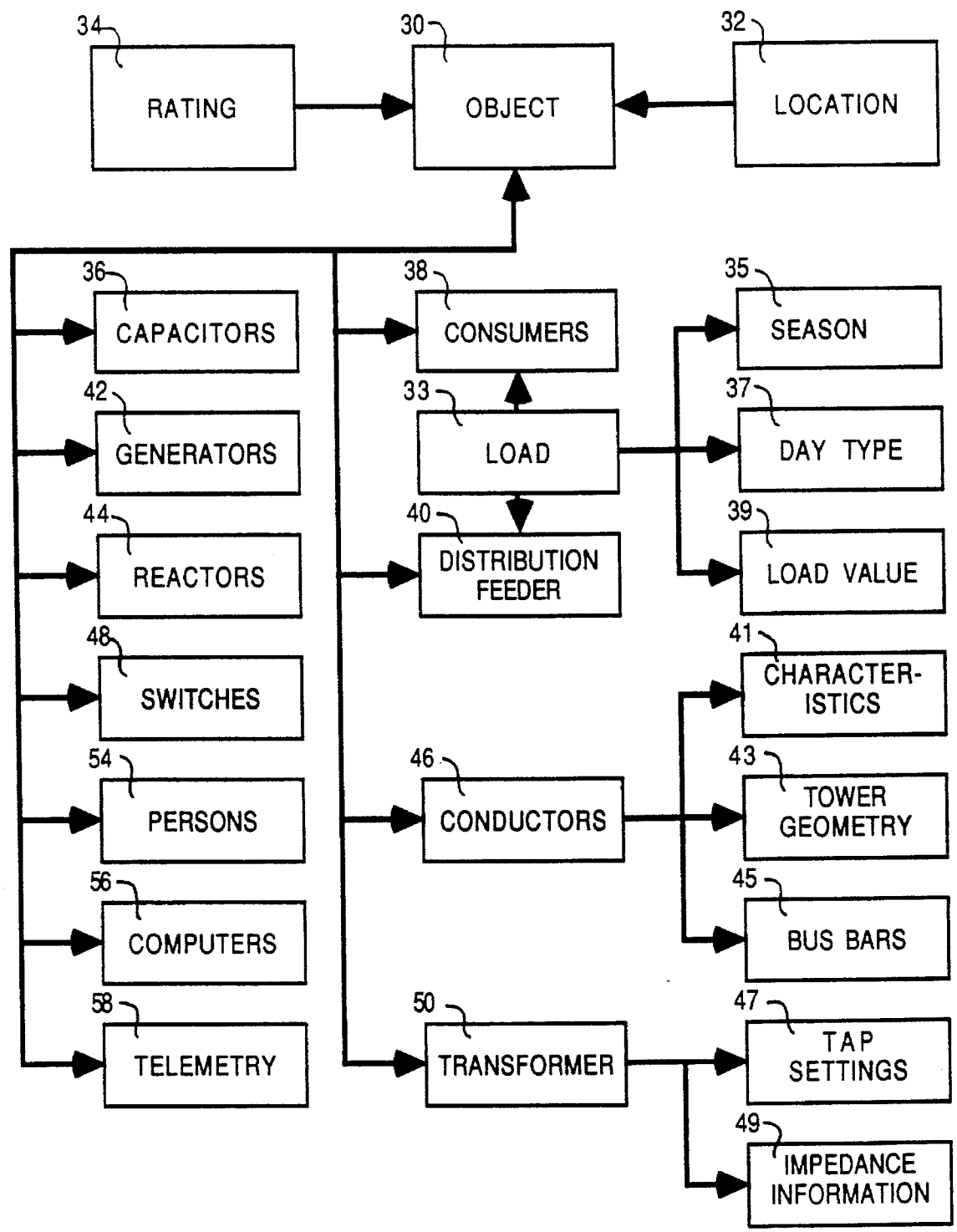
FIG. 2 is a block level hierarchical representation of a data structure in accordance with the present invention.

FIG. 2 is a block level representation of an object 30 as may be used in the present invention as a database member based on physical equipment having both a location 32 and a rating 34. The following types of conducting equipment are modeled in the power system data model provided in a preferred embodiment of the invention:

AC Overhead Line: The AC overhead line model constructs a line from a number of two terminal conductors 46. Each conductor has impedance and capacitance information associated with it that can either be entered directly or calculated by the power system data model from supplied primary data, e.g. tower geometry 43, conductor characteristics 41, and conductor length.

Busbar: Busbars 45 are considered subtypes of conductors 46 and may be modeled as physical devices, if desired. This characterization is in contrast to prior art practice of modeling a bus bar as an abstraction referred to as a node.

Capacitor: For capacitors 36, the installed MVAr is modeled.

Consumer: A consumer 38 is used to model a 'load' 33 on the power system. For a transmission model, consumers may be distribution feeders or major customers. If power system modeling is extended to include the distribution primary, consumers may be commercial enterprises with a high voltage supply or they may be housing developments. If desired, the model may be extended to individual meters. Each consumer has a base load expressed in MW or MVAr, plus voltage and frequency variations for the base load. A family of load curves that describe temporal variation of the base load can be associated with the consumer, such as season 35, day type 37, and load value 39.

Generator: Generator 42 MVA, MW, MVAr, and kV ratings, resistance and reactance, and parameters for the rate of change of the unit are modeled.

Reactor: For reactors 44, the installed MVAr is modeled.

Switch: The normal state of a switch 48 is modeled.

Transformer: The power system data model includes one- and three-phase, two- and three-winding transformers 50. Characteristics of the transformers may be entered directly from the nameplate and manufacturer's test reports as primary data, in which case the per-winding impedance information is calculated 49. The per-winding impedance data may be entered directly, if desired. Additionally, tap setting information 47 is modeled. Transformer banks may also be supported by the present invention.

Additionally, the power system data model may also model PERSONs 54, COMPUTERs 56, and TELEMETRY 58, as desired.

User Interface

In the preferred embodiment of the invention, all equipment attribute data are maintained in a single database using a window-based graphical user interface. Primary data for an object are input directly by a user. The use of windowing in the user interface permits precise control of input data at the point of entry using pull down menus and slider bars having a range bounded by the physical limits of the modeled equipment. Thus, out of range or incorrect settings are not possible and a user can be guided through an interactive data input process with little previous experience or training.

Typically, the user of the invention is an engineer having responsibility for modeling decisions concerning the electrical power system. The user interface also allows efficient data entry for administrative personnel.

Thus, the present invention features a consistent graphical user interface across all applications and for all users. A user enters attribute data via pop-up menus, pull-down menus, scrollable lists, enterable fields, dialog boxes, and mouse pointing device support, generic implementation of which is well known in the art. Data entry fields are color coded to prompt the user for the appropriate type of input. For example, electrical connectivity is defined using point and click operations to reference the physical terminals of the equipment being connected.

The invention allows several editors to be active at the same time. An editor can be started for any object in the database by clicking at any reference to that object. In the equipment editor windows, the user selects from option lists that only offer valid choices. Existing equipment may be used as a template to simplify data entry for new equipment.

The user interface of the present invention is configurable in the preferred embodiment for OSF/MOTIF, Open Look, or Windows. Typical hardware support for the present invention may include workstation type computers, such as VAXstations running VAX/VMS with INGRES or DECstations running ULTRIX/RISC with INGRES, as supplied by Digital Equipment Corporation of Maynard, Mass.

Operation

Figure 3:
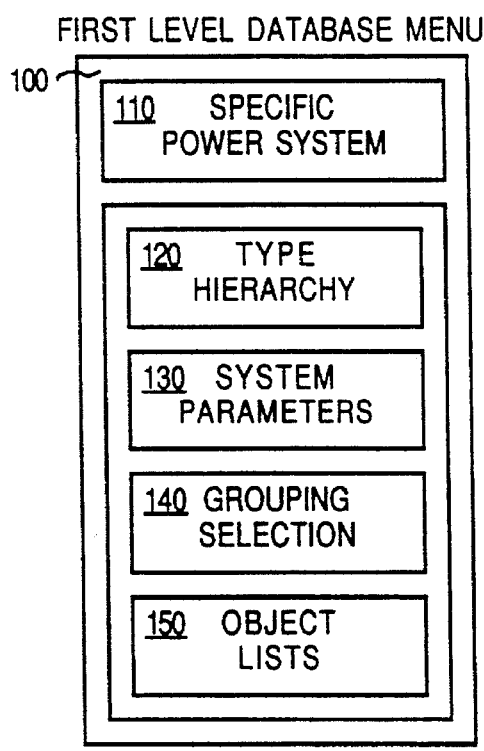
FIG. 3 is a block level representation of a first level database menu in accordance with the present invention.
Figure 4:
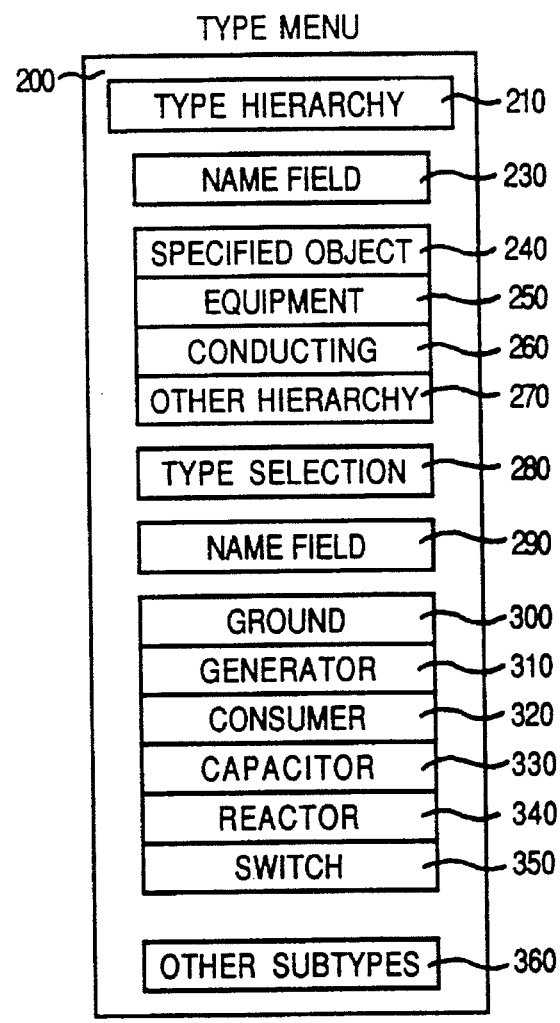
FIG. 4 is a block level representation of a type hierarchy menu in accordance with the present invention.

FIG. 3 shows a first level database menu 100 for a specific power system 110. At this level, a user accesses type hierarchy 120, system parameters 130, grouping selection 140, and object lists 150.

A user makes a selection in menu 100, for example type hierarchy 120, and is directed to a type menu 200 for the desired type hierarchy 210. Type hierarchy includes a name field 230 which identifies an established hierarchy for a specified object 240, which is further defined as equipment 250 (subtype) of a type that is conducting 260 (sub-subtype). Additional hierarchy may be provided in the remaining field 270 and several other fields, as desired, beneath it.

Once type and type hierarchy are established, a type selection is made 280, as specifically defined by a name field 290. The selection is made from the available types 300–350, for example, ground, generator, consumer, capacitor, reactor, or switch; and any additional subtypes 360.

Figure 5:
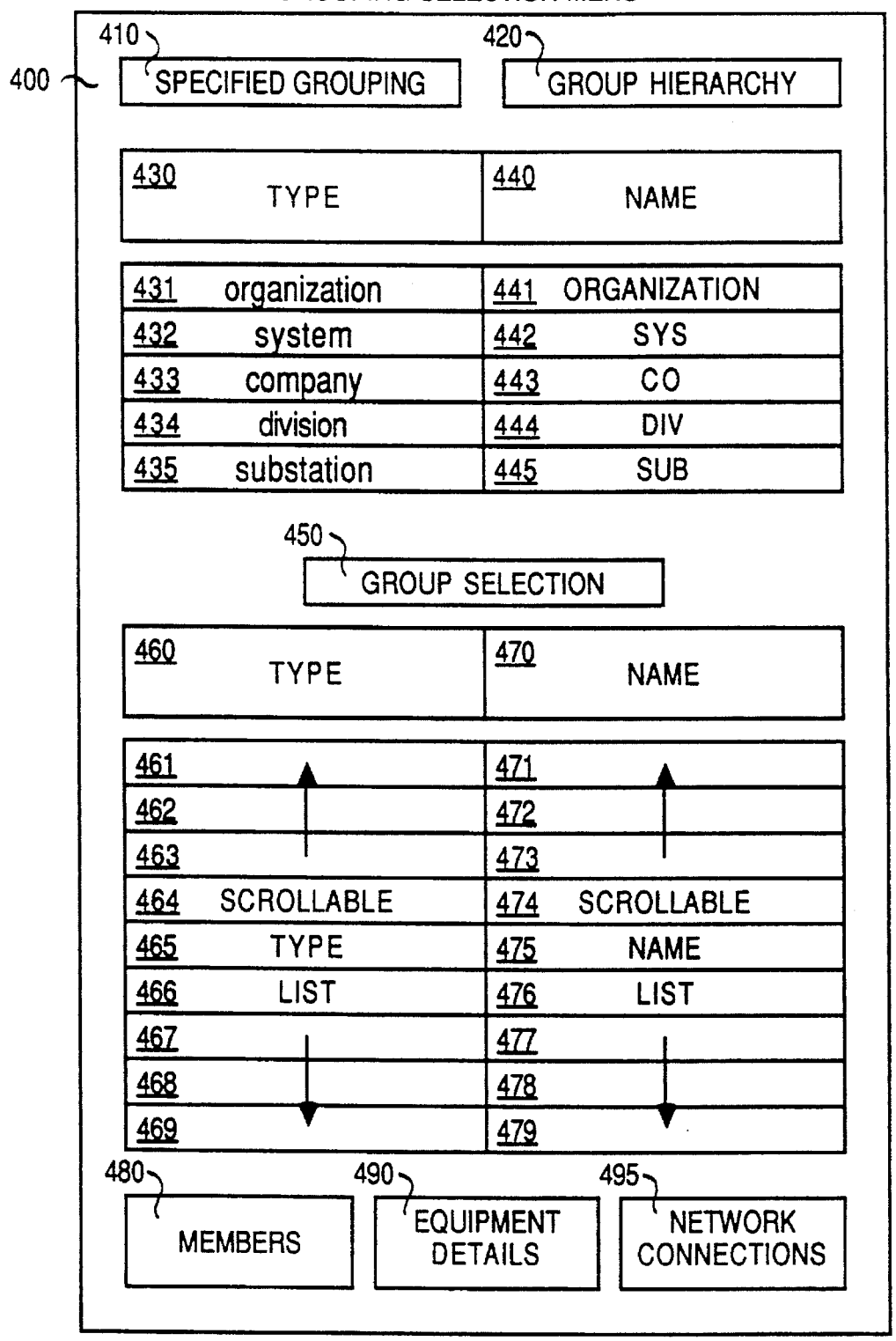
FIG. 5 is a block level representation of a group hierarchy menu in accordance with the present invention.

A grouping selection menu 400 for a specified grouping 410 is shown in FIG. 5. A first level in the menu displays group hierarchy 420 by type 430 and by name 440. Thus, group hierarchy may be structured as an organization 431 named ORGANIZATION 441, having a system 432 named SYS 442, in which there is a company 433 named CO 443, having a division 434 named DIV 444, containing a substation 435 named SUB 445, and so on.

For the group hierarchy, a group selection 450 is made, including a type 460 having a name 470. The list of objects selected would represent equipment within substation SUB and would be selected by type from a scrollable list 461–469 in which each piece of equipment on the list has a corresponding name 471–479.

For each group selected, a user can also identify members of the group 480, equipment details 490, and network connections 495.

Figure 6:
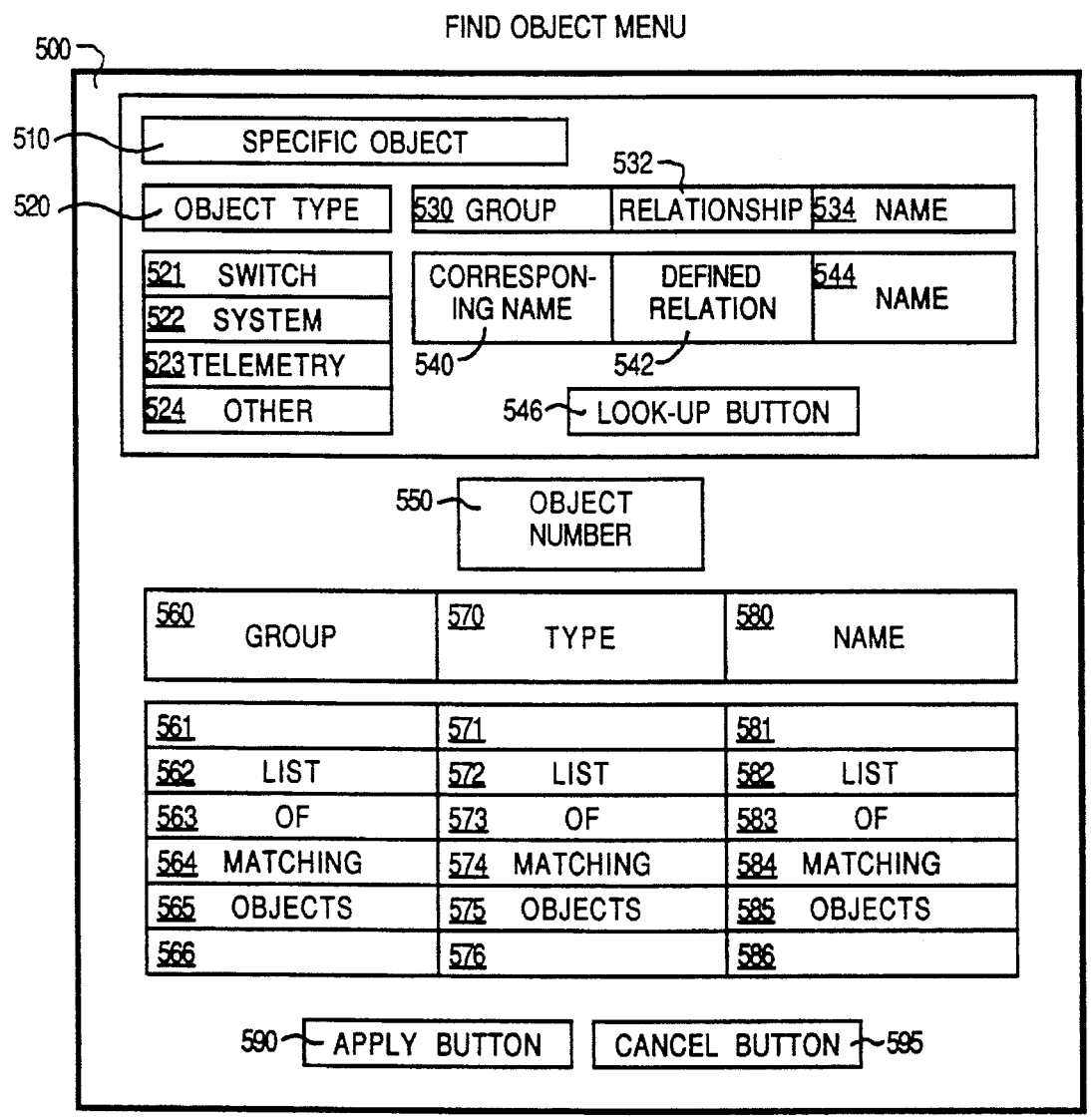
FIG. 6 is a block level representation of a find object operation in accordance with the present invention.
Figure 22:
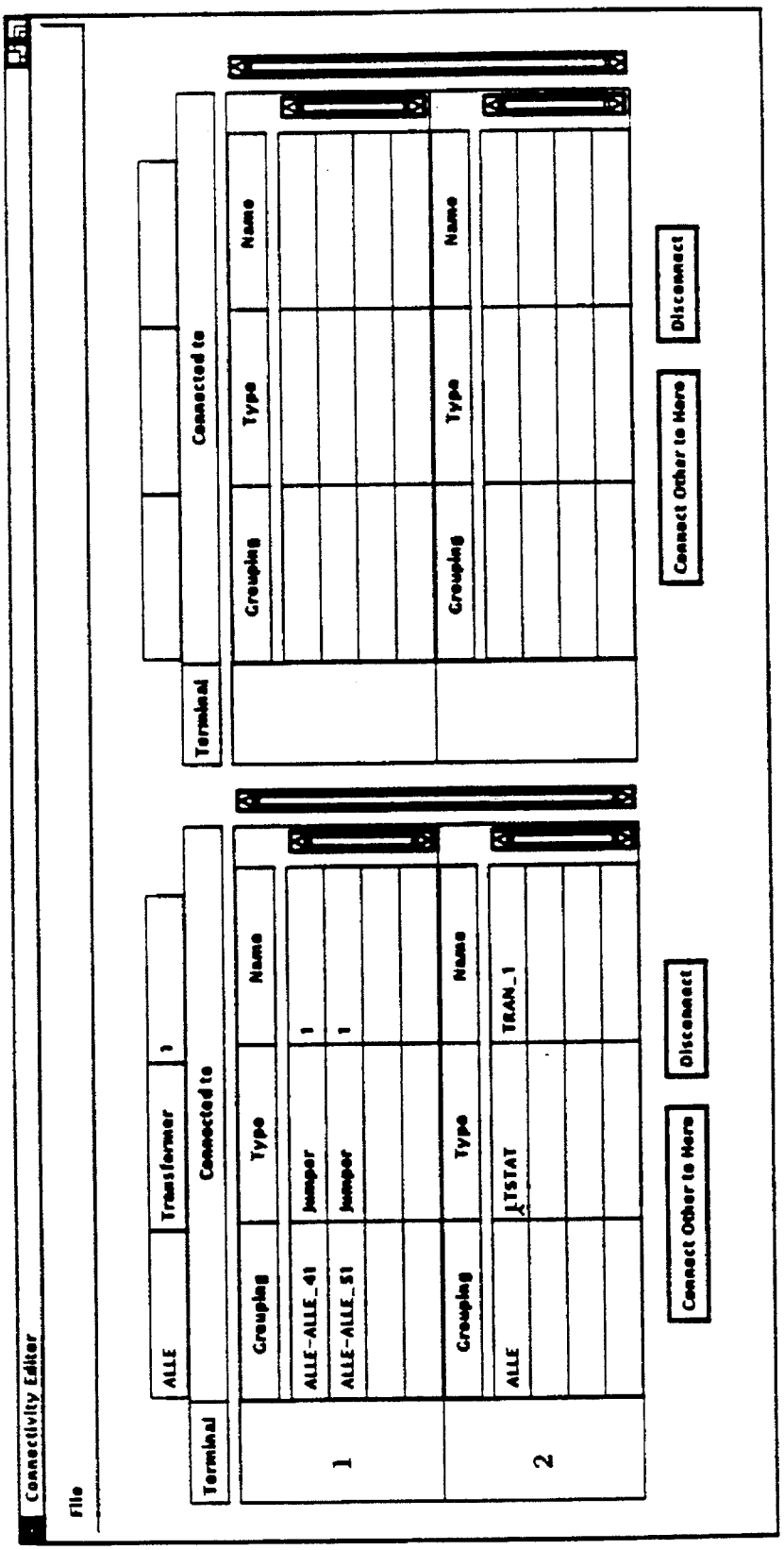
FIG. 22 is a pictorial view of a user interface window showing a data entry screen for a connectivity editor according to a preferred embodiment of this invention.
Figure 23:
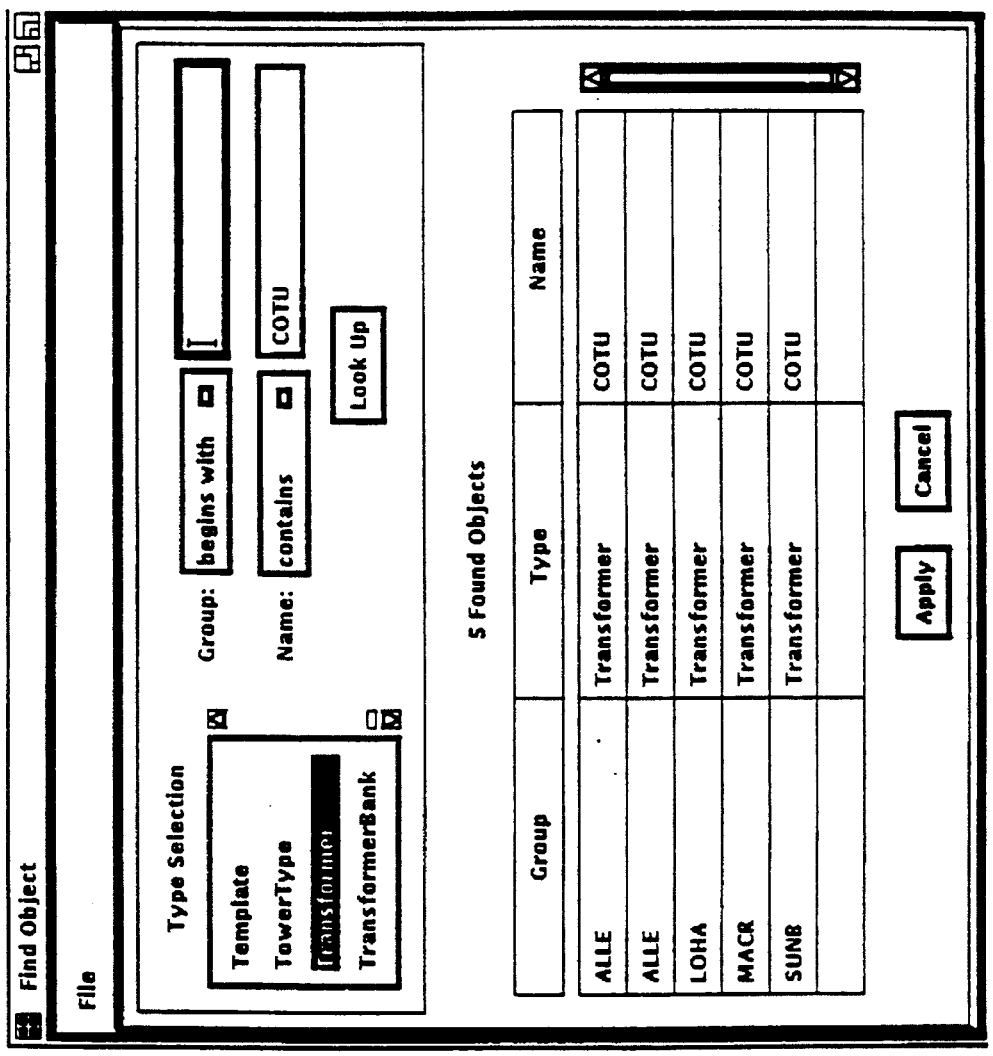
FIG. 23 is a pictorial view of a user interface window showing a preferred embodiment of the find object menu of FIG. 6.
Figure 24:
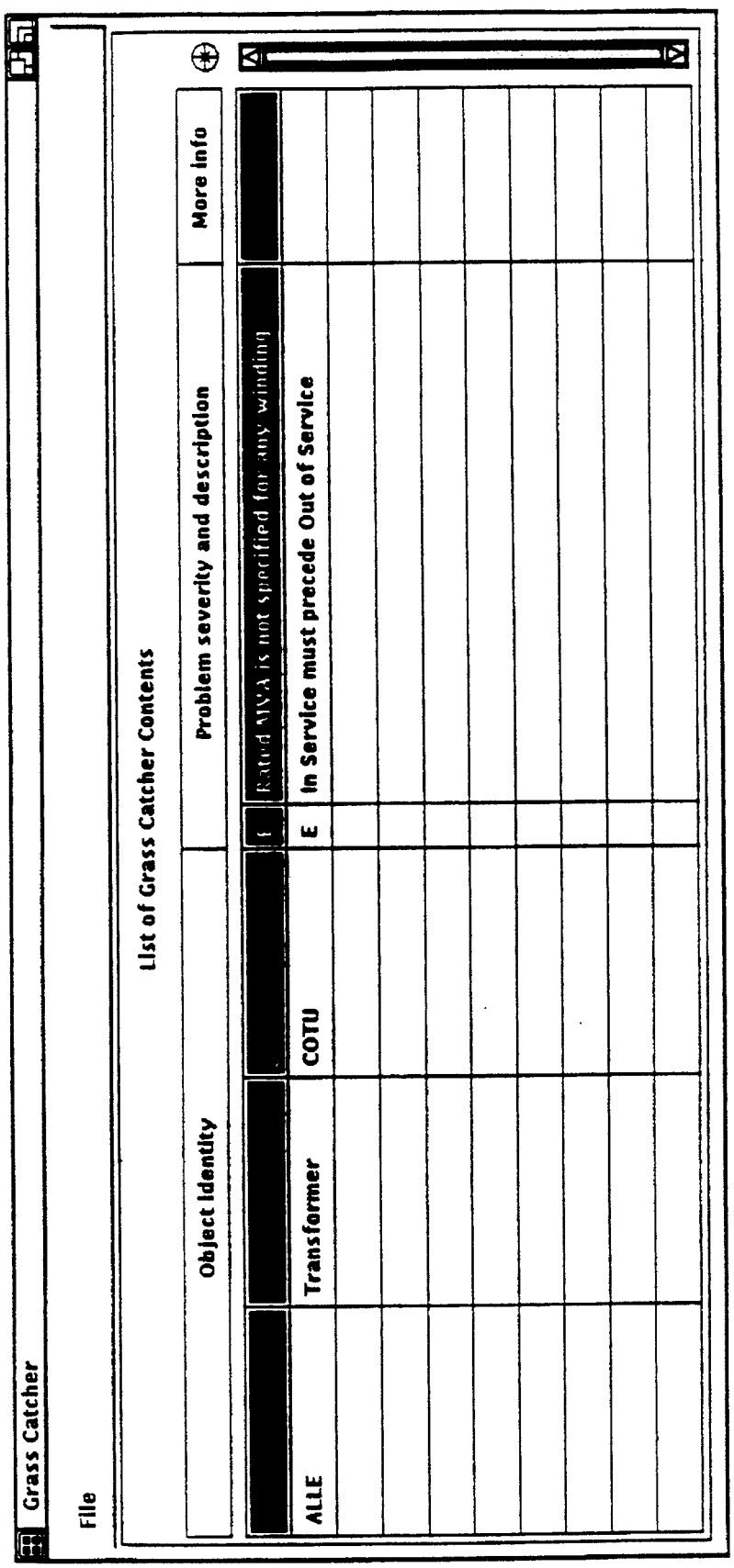
FIG. 24 is a pictorial view of a user interface window showing a data entry screen for a "grass catcher" menu according to a preferred embodiment of this invention.
Figure 25:
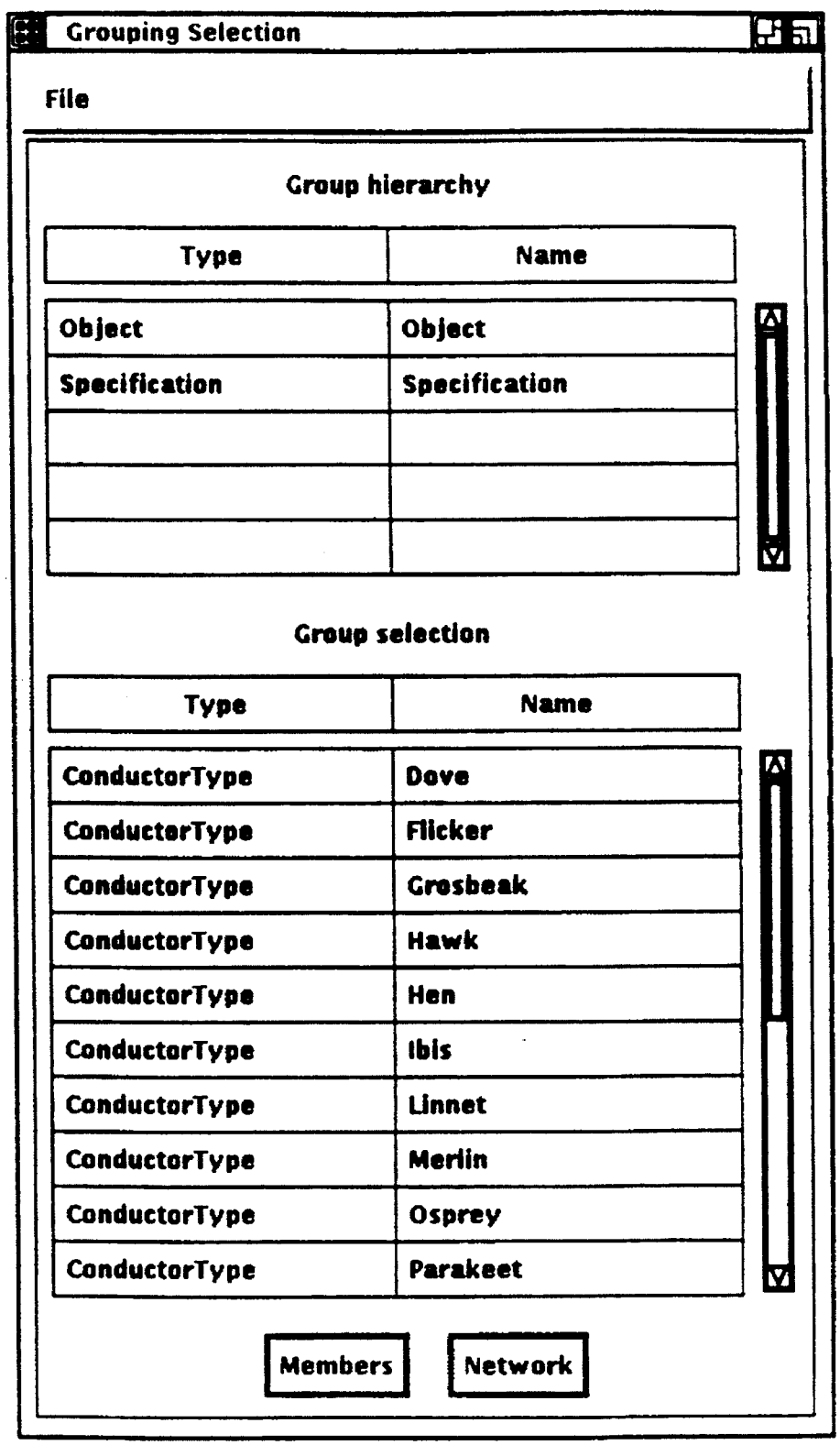
FIG. 25 is a pictorial view of a user interface window showing a preferred embodiment of the grouping selection menu of FIG. 5.
Figure 26:
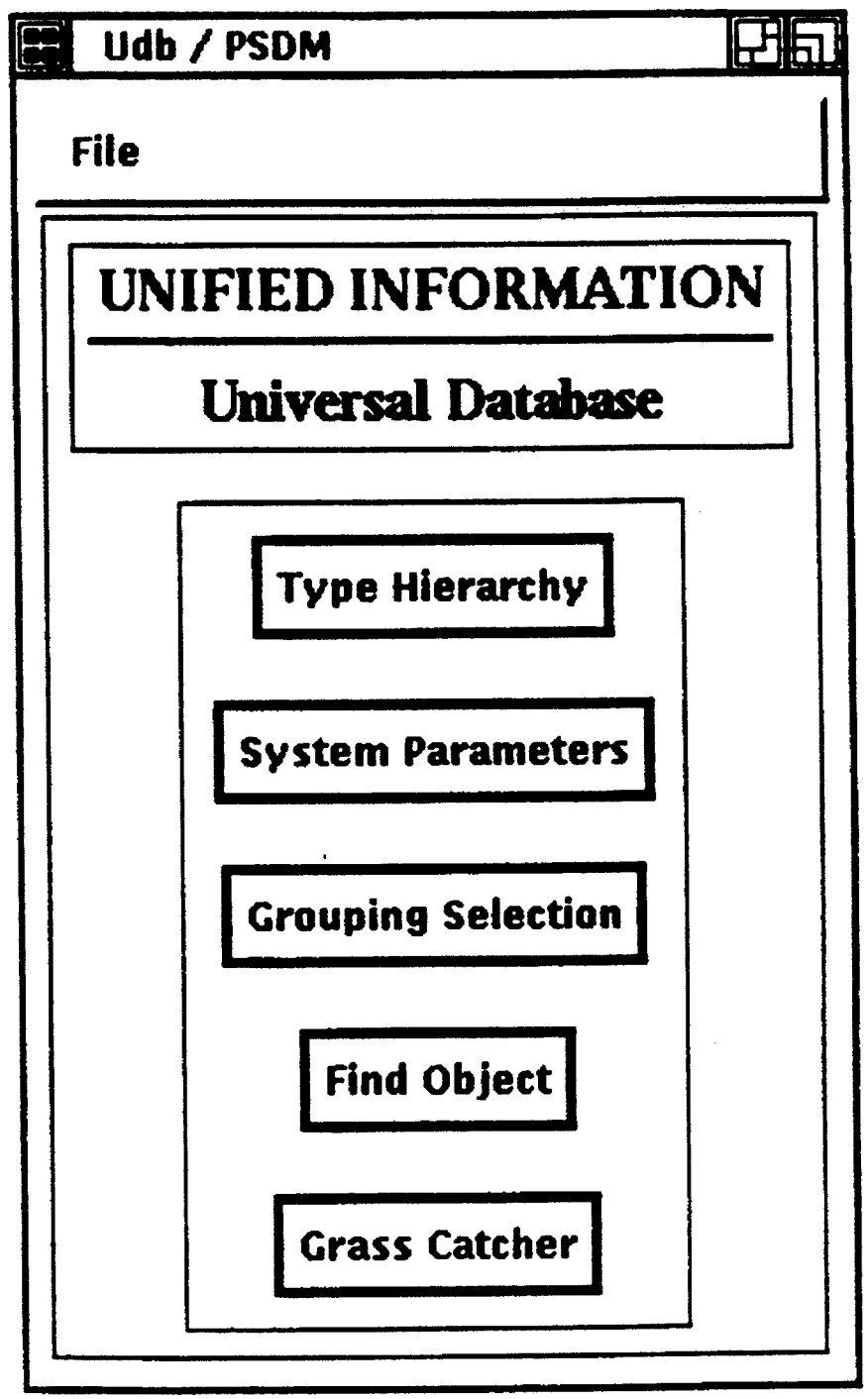
FIG. 26 is a pictorial view of a user interface window showing a preferred embodiment of the first level database menu of FIG. 3.
Figure 27:
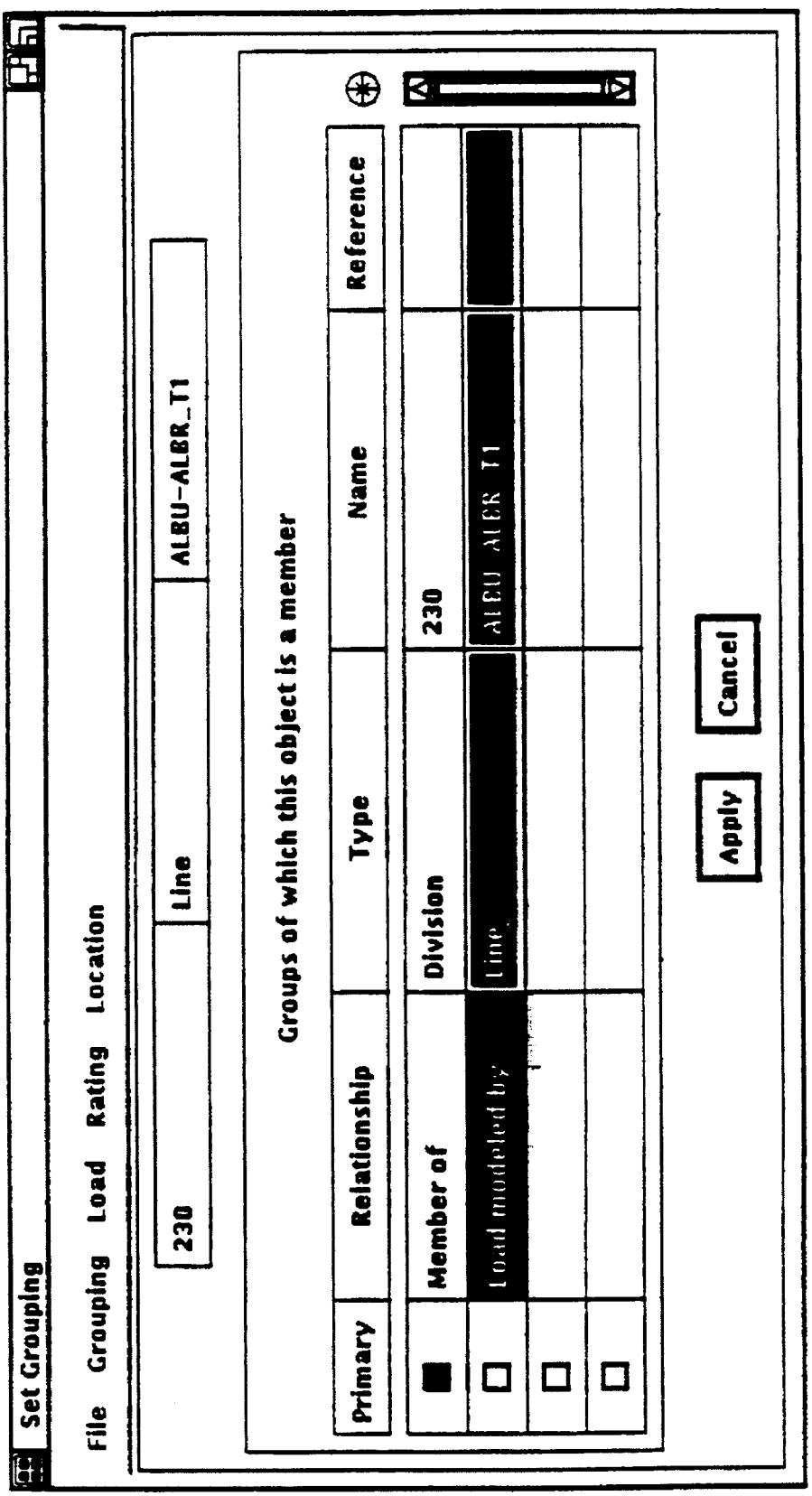
FIG. 27 is a pictorial view of a user interface window showing a data entry screen for a set grouping menu according to a preferred embodiment of this invention.
Figure 28:
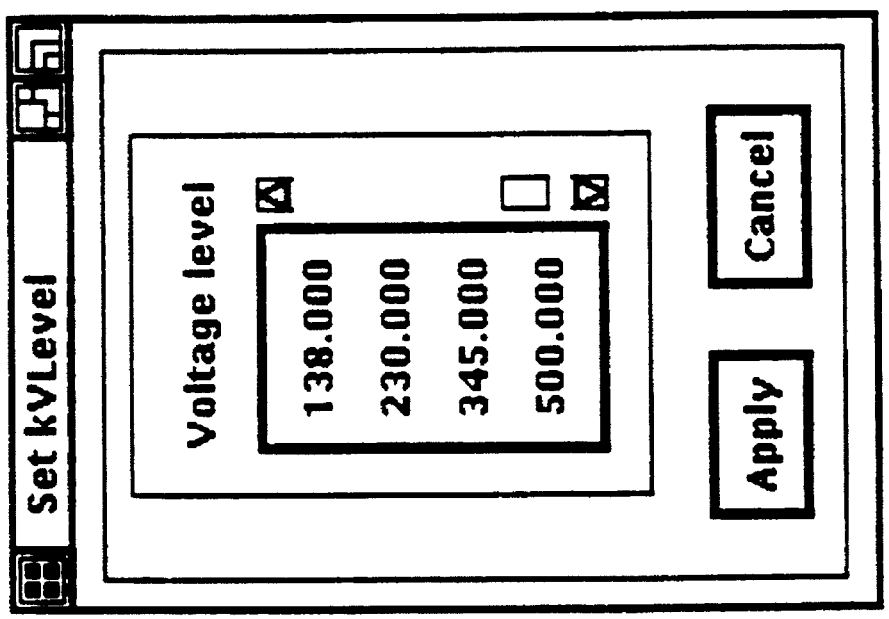
FIG. 28 is a pictorial view of a user interface window showing a data entry screen for a set kilovolt level menu according to a preferred embodiment of this invention.
Figure 29:
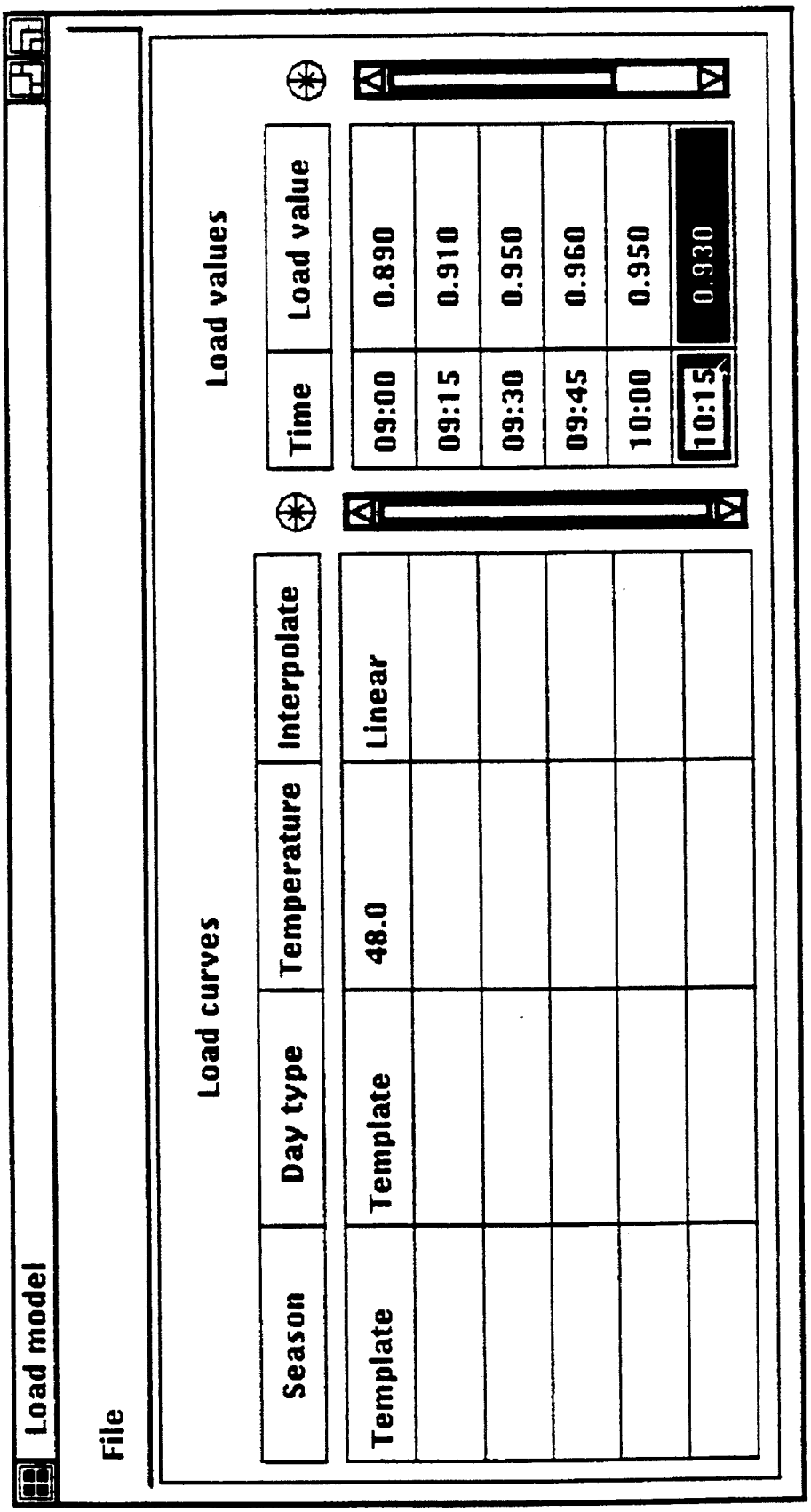
FIG. 29 is a pictorial view of a user interface window showing a data entry screen for a load modeling menu according to a preferred embodiment of this invention.
Figure 32:
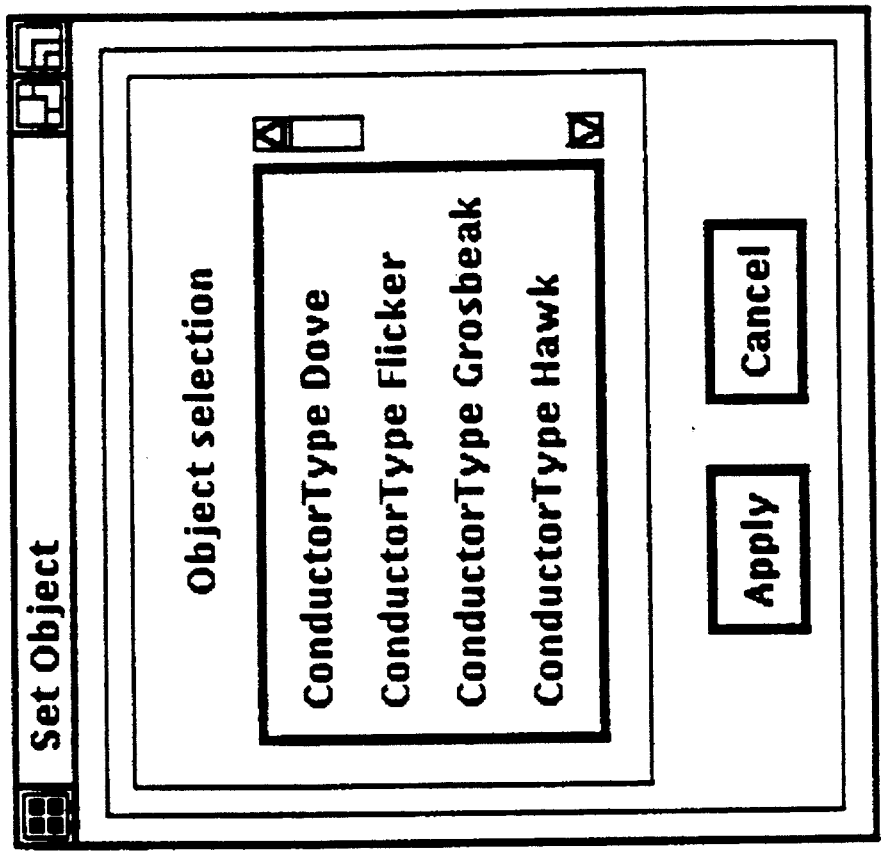
FIG. 32 is a pictorial view of a user interface window showing a data entry screen for a set object selection menu according to a preferred embodiment of this invention.
Figure 33:
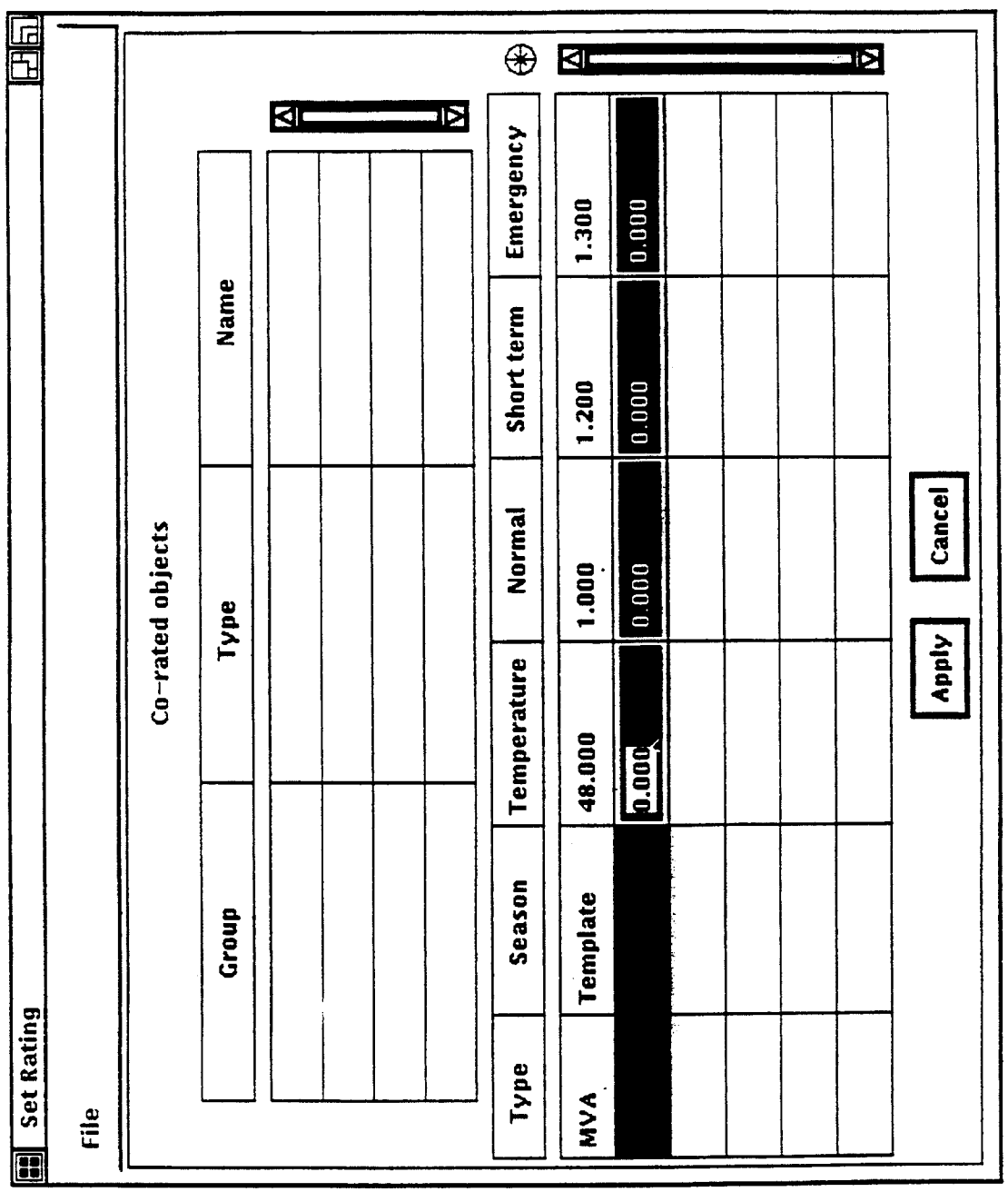
FIG. 33 is a pictorial view of a user interface window showing a data entry screen for a set rating selection menu according to a preferred embodiment of this invention.
Figure 34:
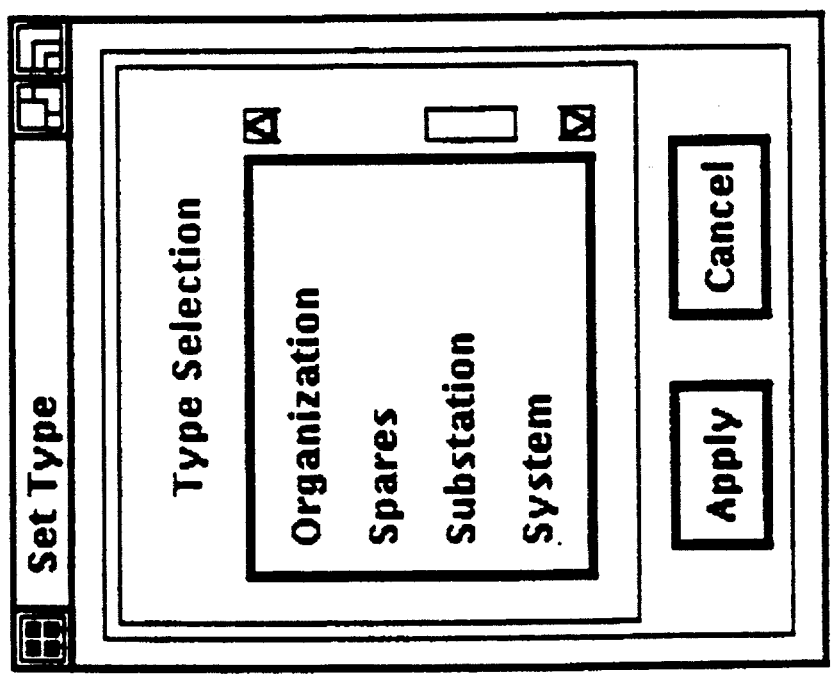
FIG. 34 is a pictorial view of a user interface window showing a data entry screen for a set type selection menu according to a preferred embodiment of this invention.
Figure 35:
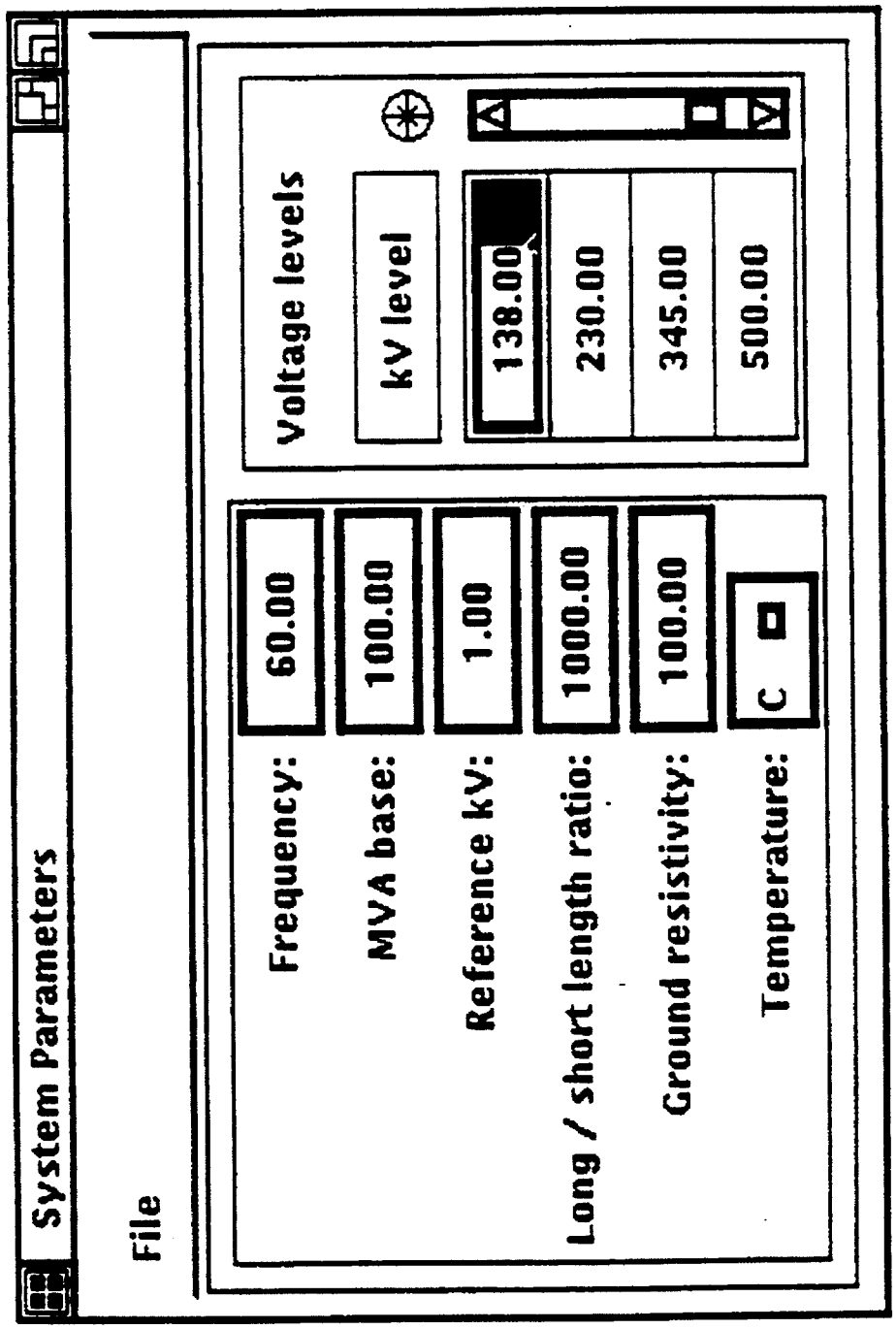
FIG. 35 is a pictorial view of a user interface window showing a data entry screen for a system parameter selection menu according to a preferred embodiment of this invention.
Figure 36:
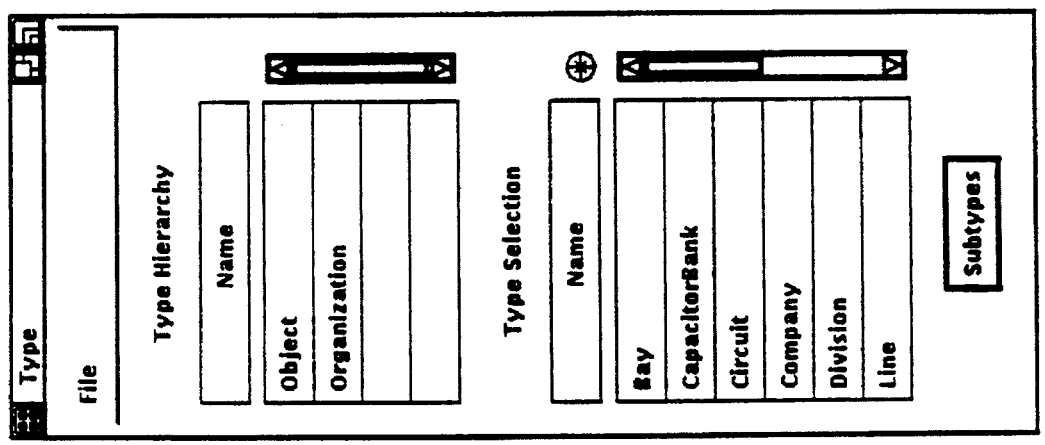
FIG. 36 is a pictorial view of a user interface window showing a preferred embodiment of the type hierarchy menu of FIG. 4.

Objects within the system may be located from the find object menu 500 for a specific object 510, as shown in FIG. 6. Thus, an object type is selected 520 from a list of types 521–524, which may include switch, system, telemetry equipment, etc. The object selected is associated with a group 530 having a relationship 532, such as 'contains', 'starts with', 'ends with', 'matches', and having a name 534.

A corresponding name 540 also has a defined relation 542, such as 'contains' for a name 544. A look-up button 546 is also provided to obtain a list of objects that match the search criteria.

The objects found are reported by number 550 and, by group 560, type 570, and name 580, each of which includes a corresponding list of matching objects (561–566, 571–576, and 581–586, respectively). Navigation through the menu is enhanced by an apply button 590 and a cancel button 595.

Although the invention is described herein with reference to the preferred embodiment, one skilled in the art will readily appreciate that additional applications, other than those set forth herein, may be substituted therefor without departing from the spirit and scope of the present invention. For example, the invention may be readily applied to other large, complex systems, including establishing models for process control in manufacturing plants and other physical systems. Accordingly, the invention should only be limited by the Claims included below.

We claim:

1. A method for creating a computer implemented single source information model based on physical elements in a system, comprising the steps of:

creating a type hierarchy, the hierarchy being downwardly extendable by a database user, the objects lower in the hierarchy being a type of the object higher on the hierarchy and inheriting attributes from the higher level objects;

identifying as objects said physical elements;

collapsing said objects into relational database tables, where attributes specific to all objects below base types are collapsed into type tables, and all objects above base types are collapsed into object tables, using a common object table with surrogate keys; and externalizing and collapsing object relationships into tables, using typing to identify the type and relationship.

2. A computer-implemented method for determining an allocation of elements in a power system by modeling in an object-oriented relational database historical and predicted performances of particular elements in the power system, comprising:

identifying the physical elements in the power system;

storing in the relational database an object table that associate an object with each element of the physical system;

storing in the relational database multiple type tables, each type table including instances of one of the objects in the database;

storing in the relational database a grouping table that defines the relationships existing among the elements at the physical system;

capturing historical performance data associated with the elements;

linking the historical performance data through a data port to the computer;

searching the relational database for a particular element;

determining the historical performance of the particular element;

changing a performance criterion of the particular element to a predicted performance criterion;

modeling the predicted performance of the particular element at different locations in the power system;

allocating the particular element to a particular location in the power system to satisfy the modeled predicted performance criterion; and updating the object table to reflect the allocation of elements in the power system.

3. A computer-implemented method for modeling a physical system using an object-oriented information model of the physical system, the information model being extendable by a user and implemented using a relational database using simple attributes that lack internal structure so that the relational database is accessible using standard relational database tools, the method comprising:

storing in the relational database an object table that defines objects associated with elements of the physical system, the object table specifying attributes of each object including the object type, and the information model creating new objects of existing or new types in response to user input;

storing in the relational database multiple type tables, each type table including entries representing instances of physical objects of the corresponding type, the information model creating type tables in response to the user creating new types of objects that are subclasses of objects defined in the object table and creating records in the type tables in response to users creating new objects of defined types;

storing in the relational database a grouping table, the grouping table defining all the relationships among the elements of the physical system, the information model adding relationships to the grouping table in response to the user creating new objects and defining relationships in which new and existing objects participate, thereby allowing the user to query the database concerning relationships involving user-defined objects using without creating new query programs to handle those newly defined objects; and selectively accessing information stored in the relational database to perform operations involving objects in the physical system.

4. The method of claim 3 in which a single object table includes all objects in the information model.

5. The method of claim 3 in which a single grouping table includes all relationships in the information model.

6. The method of claim 5 in which the grouping table includes one-to-one and many-to-one relationships.

7. The method of claim 3 in which each object in the object table corresponds to an entry in at most a single type table.

8. The method of claim 3 in which the object table contains objects that represent instances and objects that represent classes.

9. The method of claim 3 in which some objects in the object table have corresponding entries in type tables and some objects in the object table do not have corresponding entries in type tables.

10. The method of claim 3, in which each entry in a type table corresponds to an entry in the object table.

11. The method of claim 3 further comprising storing in the relational database a type-subtype table defining supertype-subtype hierarchies among the objects in the object table, the attributes of a supertype being inherited by its subtypes.

12. The method of claim 11 in which the information model automatically updates the type-subtype table when the user creates a new type or subtype.

13. The method of claim 11 in which subtypes includes attributes in addition to those inherited from the corresponding supertypes.

14. The method of claim 3, additionally comprising:

assigning to each object in the object table a unique surrogate key by which the object is identified, the surrogate key being used as a foreign key in corresponding type tables and grouping tables; and searching the relational database for a particular surrogate key using a balanced binary tree index employing sequential keys.

15. The method of claim 3 in which the data model includes base types that are used to map objects for database procedures, including data input and editing procedures.

16. The method of claim 3 in which the grouping table includes organizational relationships and functional relationships.

17. The method of claim 3, further comprising accessing and modifying information stored in the relational database through a graphical user interface based on a window environment and in which the user inputs data into the system from a set of possible input data contained within the system to reduce error in data entry.

18. The method of claim 3 in which the information model includes system objects that are not modifiable by the users, user application objects that are used by user-written applications to define well known or reserved types, and users types that are defined and modified by the user to express the desired depth of classification.

19. The method of claim 3, further comprising:

interconnecting the computer with a second computer using a data transfer pathway; and importing data from a database associated with the second computer, such that a single point of maintenance is provided at the computer.

20. The method of claim 3, further comprising:

interconnecting the first computer with a second computer using a data transfer pathway; and exporting data from the computer to database the second computer, such that a single point of maintenance is provided at the computer.

21. The method of claim 3, further comprising capturing operating states of the physical system in a historic data storage system for later analysis.

22. The method of claims 3, further comprising assigning to selected objects a network position identifier which is independent of specific object attributes and which serves as a place holder within the model of the power system.

23. The method of claim 3 further comprising storing in a table of the relational database permissible relationships among objects and verifying that user-defined relationships are permissible before adding the relationship to the grouping table.

24. The method of claim 3 further comprising storing in the relational database acceptable object attribute values and verifying that values provided by the user for object attributes corresponds to the acceptable values.

25. The method of claim 3 in which the physical system of elements is an electrical power system.

26. The method of claim 25 in which the grouping table includes the relationships of connectivity, grouping, and location.

27. The method of claim 3 in which the physical system comprises an electric power system and the information model includes information corresponding to network topology, operational constraints, telemetry, and communication details.

* * * * *